(12) United States Patent
Nagashima

(10) Patent No.: US 7,377,852 B2
(45) Date of Patent: May 27, 2008

(54) SERVER PROVIDING COMPETITIVE GAME SERVICE, PROGRAM STORAGE MEDIUM FOR USE IN THE SERVER, AND METHOD OF PROVIDING COMPETITIVE GAME SERVICE USING THE SERVER

(75) Inventor: Kouzo Nagashima, Osaka (JP)

(73) Assignee: Aruze Co., Ltd., Tokyo (JP)

( * ) Notice: Subject to any disclaimer, the term of this patent is extended or adjusted under 35 U.S.C. 154(b) by 0 days.

(21) Appl. No.: 10/025,319

(22) Filed: Dec. 19, 2001

(65) Prior Publication Data

US 2002/0082088 A1    Jun. 27, 2002

(30) Foreign Application Priority Data

Dec. 20, 2000    (JP)    ............................. 2000-387938

(51) Int. Cl.
    *A63F 13/00*    (2006.01)
(52) U.S. Cl. ....................................................... 463/42
(58) Field of Classification Search ................... 463/1, 463/40–42, 29, 24
    See application file for complete search history.

(56) References Cited

U.S. PATENT DOCUMENTS

| | | | |
|---|---|---|---|
| 5,046,736 A * | 9/1991 | Bridgeman et al. ........... | 463/13 |
| 5,830,067 A * | 11/1998 | Graves et al. ................ | 463/40 |
| 5,917,725 A * | 6/1999 | Thacher et al. ............... | 700/91 |
| 6,024,643 A * | 2/2000 | Begis ........................... | 463/42 |
| 6,050,895 A * | 4/2000 | Luciano et al. ................ | 463/7 |
| 6,080,063 A * | 6/2000 | Khosla ......................... | 463/42 |
| 6,106,395 A | 8/2000 | Begis | |
| 6,125,388 A * | 9/2000 | Reisman ..................... | 709/218 |
| 6,155,927 A * | 12/2000 | Levasseur et al. ............. | 463/42 |
| 6,287,202 B1* | 9/2001 | Pascal et al. ................. | 463/42 |
| 6,322,451 B1* | 11/2001 | Miura .......................... | 463/42 |
| 6,368,218 B2* | 4/2002 | Angell, Jr. .................... | 463/40 |
| 2002/0086732 A1* | 7/2002 | Kirmse et al. ................ | 463/42 |

FOREIGN PATENT DOCUMENTS

| | | |
|---|---|---|
| JP | A-09-164272 | 6/1997 |
| JP | A-H09-234285 | 9/1997 |
| JP | H11-057215 A | 3/1999 |
| JP | A-2000-167239 | 6/2000 |
| JP | A-2000-237450 | 9/2000 |
| WO | WO 00/01453 | 1/2000 |
| WO | WO 00/44458 | 8/2000 |

OTHER PUBLICATIONS

William W. Connors: Id Software, Inc., Quake III Arena, Mar. 12, 1999.*

(Continued)

*Primary Examiner*—Ronald Laneau
*Assistant Examiner*—Tramar Harper

(57) ABSTRACT

A competitive game program and virtual game player list are previously stored in a server. The server provides on network a competitive game service to a plurality of game players' terminals via communication lines. The server sets such that, under the condition that the number of competitors against the game players is below a predetermined number, the competitive game program is activated to play the competitive game with the game players, and notifies, as a competitor, a virtual game player's name previously entered on the virtual game player list, to the game players who are to play the competitive game with the competitive game program. Therefore, the game player can enjoy the competitive game with the virtual game player, even if the number of competitors is insufficient when receiving the competitive game service. This avoids the inconvenience that although the game player (user) has access to the competitive game site for the purpose of playing the competitive game, the player cannot help giving up playing the game.

17 Claims, 37 Drawing Sheets

OTHER PUBLICATIONS

Starcraft Co. website: http://www.starcraft.co.kr/, game sold in 1997.
Quake 3: Arena, id software, released Mar. 12, 1999.
Quake 3: Arena, server setup guide, http:wiki.dragonflybsd.org/index.php/HOWTO/Set_up_a_Quake_III_Arena_server.
Quake 3: Arena, console commands and screenshots.

Hirono, Tadatoshi, "Access Girls' Internet Mah-jongg software from SystemSoft Corporation", DOS/V Power Report, vol. 8, No. 8, p. 318, Aug. 1, 1998. (Japan). Accompanied by brief summary in English of reference.

* cited by examiner (PRO-*Shogi* TABLE APPRECIATION)

☐ OUTLINE
· PUBLICTION OF *Shogi* TABLE DATA OF FORMAL GAMES (WHEN STARTING SERVICE, *Shogi* TABLE DATA OF WOMENS' PRO-*Shogi* PLAYERS' CHAMPIONSHIP SERIES ARE PUBLISHED *Shogi* TABLES OF OTHER FORMAL CHAMPIONSHIP SERIES IS SCHEDULED FOR PUBLICATION)
☐ UPDATE FREQUENCY
· ANYTIME
☐ FLOW OF SCREEN (NEXT MOVE)

☐ OUTLINE
- "NEXT MOVE !" OF SCENE ON WHICH THE ISSUE CAN HANG (THREE-CHOICES RER QUESTION) PORTABLE TELEPHONE STRAP etc SPECIALLY MADE BY LEAGUE ARE PRESENTED TO THOSE WHO GAVE ALL RIGHT ANSWERS AND WIN A PRIZE IN A LOTTERY !

☐ UPDATE FREQUENCY
- FIVE QUESTIONS OF "NEXT MOVE" PREPARED BY LEAGUE ARE UPDATED ON THE FIRST DAY OF EVERY MONTH

☐ FLOW OF SCREEN (AIM AT PRO-Shogi PLAYER!)

☐ OUTLINE
• IN THE TIMELIMIT, THE PERCENTAGE OF VICTORIES THROUGH THIS GAME, YOU CAN UNDERGO "WAY TO PRO-Shogi PLAYER" IN RPG FASHION, WHILE INCREASING PERCENTAGE OF VICTORIES TO TOTAL NUMBER OF MATCHES WITH COMPUTER, AND YOU CAN LEARN!

☐ FLOW OF SCREEN

Fig.13
(*Shogi* PLAYERS' PROFILES)
☐ OUTLINE
　・INFORMATION OF BRIEF PROFILE OF PRO-*Shogi* PLAYERS !
☐ UPDATE FREQUENCY
　・ANYTIME
☐ FLOW OF SCREEN
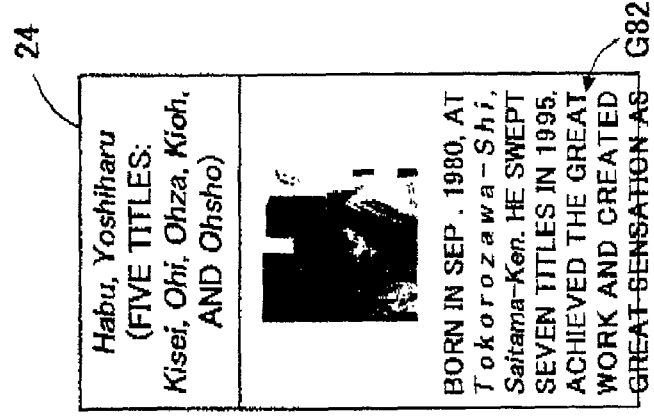
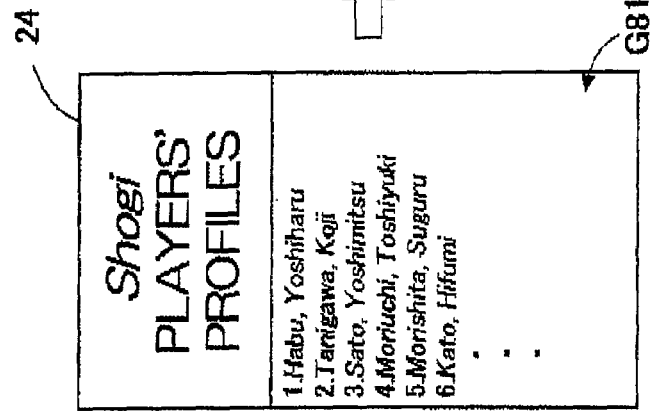
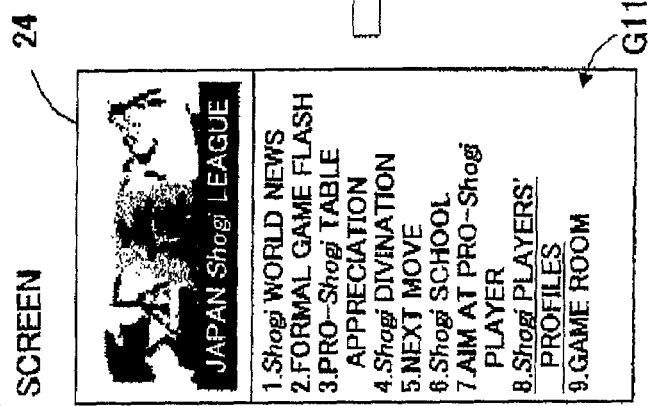

O SETTING OF "GAME ROOM"
"GAME ROOM" IS SET CLASS BY CLASS, AT WHICH GAME IS POSSIBLE WITH ANY PERSON. GAME ROOM HAS TWO FLOWS OF "STANDBY" AND "CHALLENGE".

◇ OVERALL FLOW (STANDBY TIME)

○ SETTING OF "GAME IMPRESSION"

"GAME IMPRESSION" IS TO GIVE IMPRESSIONS OF COMPETITOR'S MOVES AFTER GAME. PERSON-TO-PERSON GAME IS LIKE ACTUAL *Shogi*. MAIL-COMMUNICATION IS DONE VIA SERVER.

◇ OVERALL FLOW (PERSON-TO-PERSON GAME TIME)

Fig.24

① BECOME PUPIL (A21)

BECOME PUPILE OF "Shisho".

⇨

"CAPABILITY" IS TESTED. QUESTION BECOMES DIFFICULT GRADUALLY.

⇨

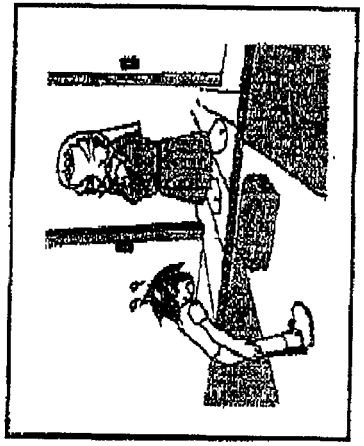

IF QUALIFIED, GO TO NEXT STEP.
IF DISQUALIFIED, RETURN TO INITIAL STEP.

○ THERE ARE ABOUT 10 QUESTIONS, WHICH ARE PUT AT RAMDOM FROM PLURAL (ABOUT 100) QUESTIONS. BUT, DEGREE OF DIFFICULTY IS INCREASED GRADUALLY, STARTING WITH EASIER QUESTION.
○ RATE OF CORRECT ANSWER OF "CAPABILITY" TEST IS RELATED TO NEXT STEP.
○ LOW RATE OF CORRECT ANSWER (e.g. BELOW 20%) RESULTS IN DISQUALIFIED.

Fig.25

② JOIN "PROMOTION CLUB" (A22)

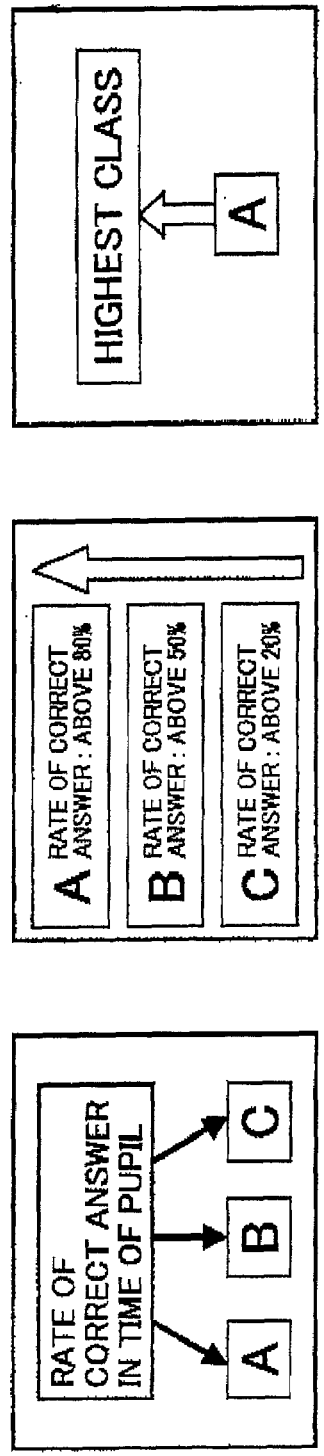

○ "PROMOTION CLUB" IS GAMES ORIGINAL MEANS.
○ RATE OF CORRECT ANSWER IN "CAPABILITY" TEST ON PREVIOUS PAGE IS USED AS REFERENCE OF CLASSIFICATION.
○ PLAYER IS QUALIFIED BY CLEARING AT CERTAIN RETE OF VICTORY IN CERTAIN NUMBER OF GAMES, AND PROMOTED TO HIGHER CLASS.
○ NUMBER OF GAMES IS TO BE FOUR TO SIX. PLAYER IS QUALIFIED BY ABOUT 50% OF RATE OF VICTORY IN C- CLASS.
○ NUMBER OF GAME AND RATE OF VICTORY INCREASE AS CLASS BECOMES HIGHER.

PLAYER CAN TAKE HERE A PIECE OF ADVICE OF "Shisho" BEFORE GAME.

Fig.26

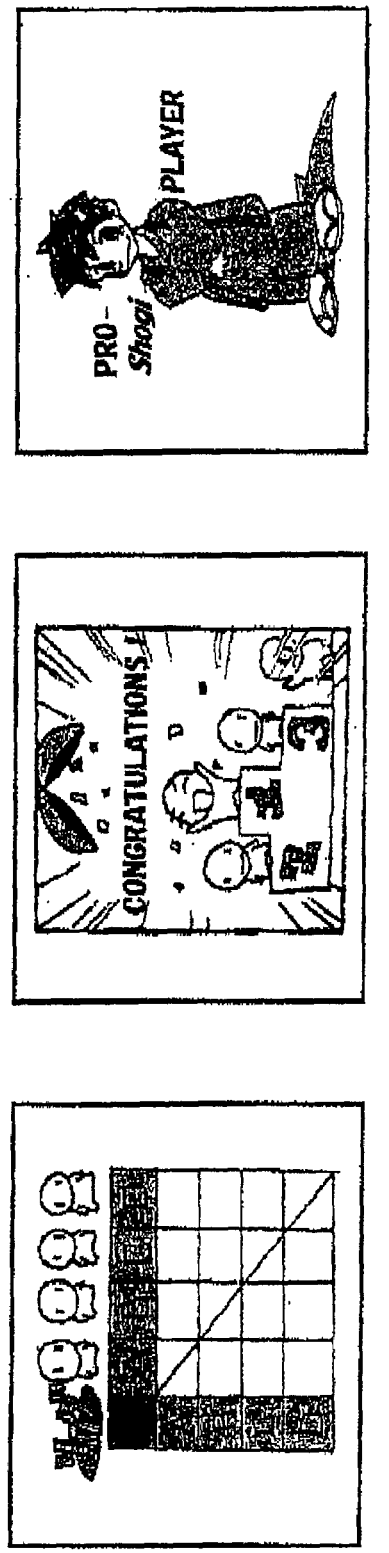

③ TEST FOR PRO-Shogi PLAYER (A23)

AS ONE OF HIGHEST CLASS, PLAYER IS JOINED IN LEAGUE GAME WITH ALL CLASS MEMBERS.

⇨ QUALIFIED AS PRO-Shogi PLAYER IF REMAINS IN HIGH-RANKING FOR PLAYERS AFTER LEAGUE GAME.

⇨ GAME IS CLEARED.

○ NOT ONLY BETWEEN USERS BUT CPUs ARE JOINED IN LEAGUE GAME. (ONLY RESULTS ARE DISPLAYED)
○ RESULT OF LEAGUE GAME IS TO BE DISPLAYED WHEN RESULT OF GAME IS OBTAINED.
○ NO ADVICE OF "Shogi" IS AVAILABLE IN THIS GAME.
○ NUMBER OF CLASS MEMBERS IS SET TO ABOUT 8 TO 12, TAKING TOTAL NUMBER OF GAMES INTO CONSIDERATION.

Fig29

◇ ABOUT RANKING

WITH THIS MODE, IT IS ABLE TO COMPETE WITH OTHER USER FOR NUMBER OF CHALLENGE NEEDED IN ATTAINING CLEAR.
HIGH-RANKING 10 TITLE HOLDERS AND CONNECTED USERS ARE TO BE DISPLAYED. TO BE DISPLAYED BY MAKING SELECTION WITHIN MODE.

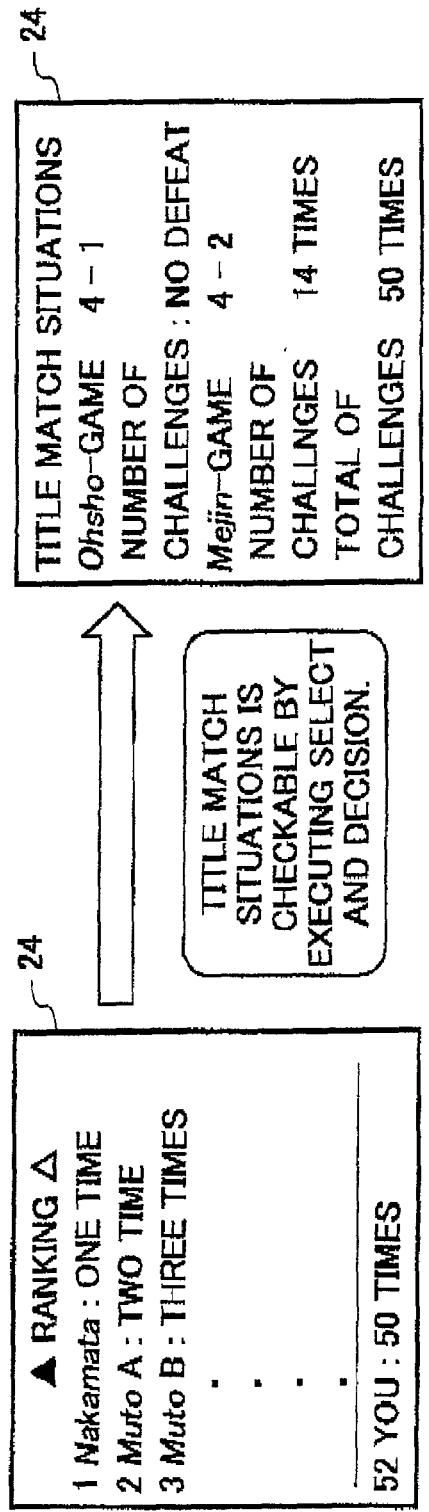

* ALTHOUGH DISPLAYED ON SAME ROW ON RANKING LIST IF CLEARED AT MINIMUM (ONE TIME) CHALLENGE, CONTENTS OF GAME SITUATIONS IN GAINING EACH TITLE AND NUMBER OF MOVES PER GAME WILL BE REFLECTED TO RANKING DISPLAY.

Fig.30

○ COORDINATE INPUT METHOD

TO BE PROGRESSED BY COORDINATE-INPUT DESIGNATION AS IN NORMAL GAME. THIS SEEMS FOR THOSE WHO ARE FAMILIAR WITH Shogi, BECAUSE USERS ARE REQUIRED TO INPUT AFTER CONSIDERING SOLUTIONS BY THEMSELVES.

THIS IS USEFUL WHEN USER IS REQUIRED TO PRESENT SOLUTIONS, SUCH AS APPROVAL OF GRADE.

○ SELECTION METHOD

SELECT ONE FROM THREE TO FIVE ITEMS FOR EACH MOVE. THIS IS EASY FOR BIGINNERS BECAUSE SOLUTION EXISTS IN PRESENTED ITEMS.

THIS METHOD IS OPTIMUM AS FIRST STEP, SUCH AS UNDERSTANDING OF RULE IN CHESS PROBLEM (*Tsume-Shogi*).

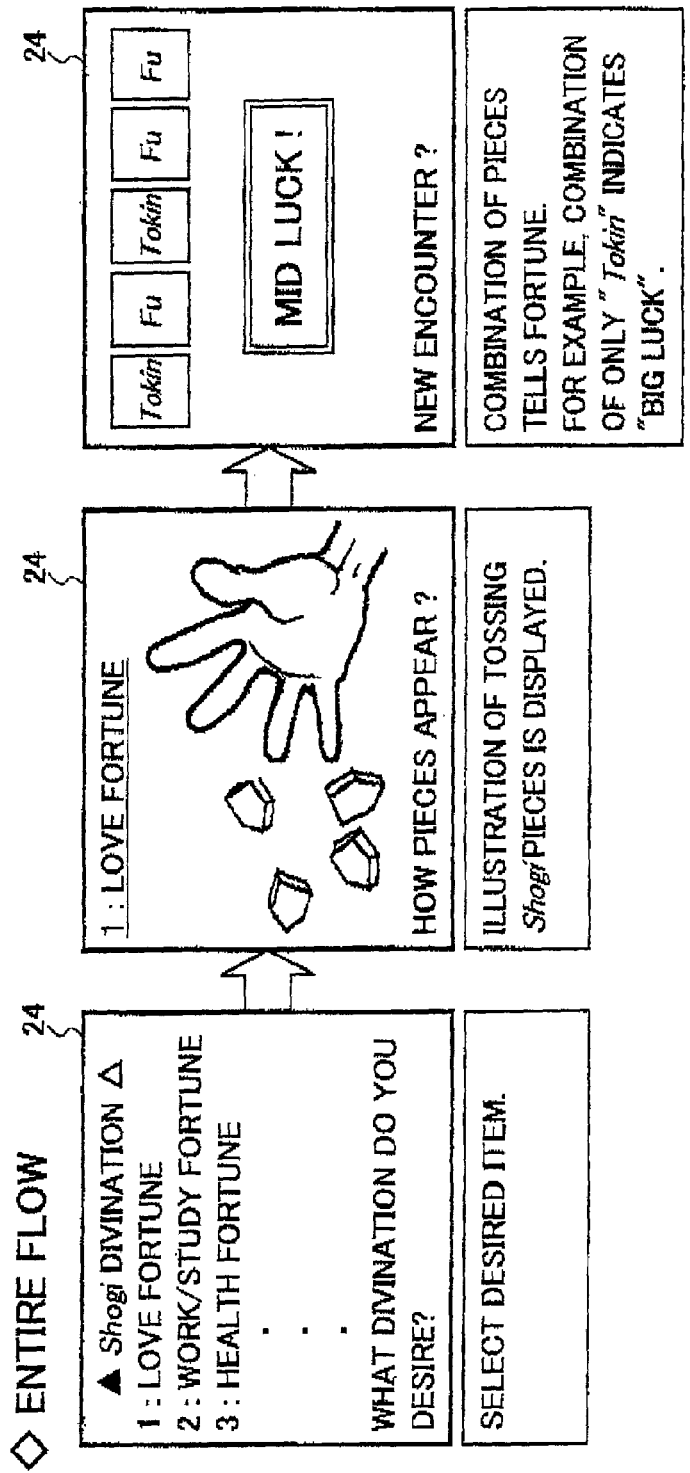

② MOVING *Shogi* PIECE METHOD

TO *Shogi's* PIECES (FROM "*Fu*" TO "*Oh*") PLACED ON BOARD, ARBITRARY PIECE IS MOVED CERTAIN TIMES BY USER. DIVINATION IS CONDUCTED BASED ON SELECTED AND MOVED PIECES.
ORDER USER MOVED PIECES CORRESPONDS TO DIVINATIONS ABOUT "LOVE", "WORK/STUDY", AND "HEALTH"

◇ ENTIRE FLOW

Fig.33

③ TURN-INSIDE-OUT METHOD

FROM THREE TO FOUR PIECES HAVING BLANK REAR, EACH PIECE FRONT BEING PLACED DOWNWARD, ONE IS SELECTED ARBITRARILY BY USER. SELECTED PIECE IS TURNED INSIDE OUT. DIVINATION IS CONDUCTED BASED ON KIND OF PIECE COMING OUT ("Fu" TO "Oh"). REASON WHY ALL KINDS OF PIECES ARE NOT DISPLAYED WHEN USER MAKES SELECTION IS THAT DIVINATION IS ALREADY PROCEEDED TO SOME DEGREE BEFORE SELECTION. ORDER USER SELECTED PIECES CORRESPONDS TO ITEMS OF "LOVE", "WORK/STUDY" AND "HEALTH".

◇ ENTIRE FLOW

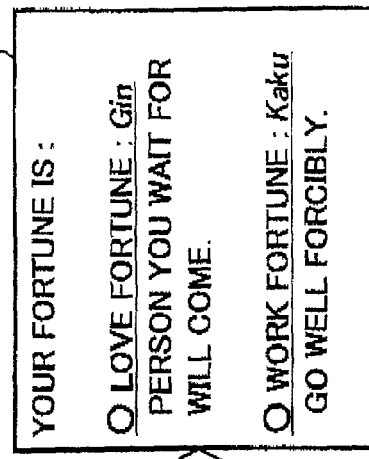

DESIRED PIECE IS SELECTED.

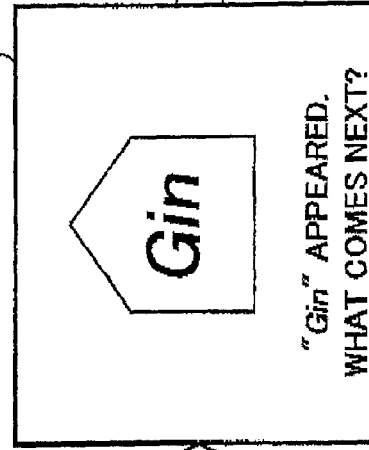

FRONT OF SELECTED PIECE IS DISPLAYED.
THIS IS REPEATED CERTAIN TIMES.

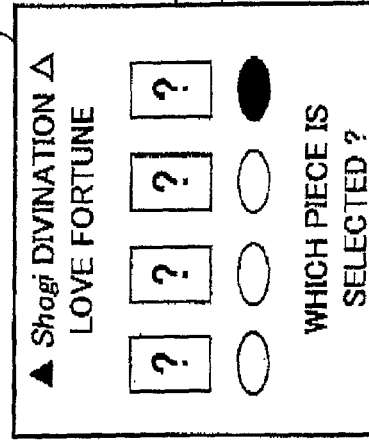

RESULTS ARE DISPLAYED.

Fig.34

○ ABOUT GAMES

GAMES OBTAINED BY APPLYING IRREGULAR RULES TO NORMAL Shogi ARE PROVIDED TO USERS SO THAT THEY AMUSE THEMSELVES WITH NEW PLAY.

◇ PIECE-TAKING Shogi

- ○ USER COMPETE IN SUM POINTS OF PIECES THEY TOOK FROM COMPETITOR WITHIN DETERMINED NUMBER OF MOVES, SUCH AS 100 OR 200 MOVES.
- ○ THIS IS BASICALLY SAME AS Shogi RULE (EVERY PIECE POINT IS SAME).
- ○ GAME IS OVER WHEN "Oh" IS TAKEN. PLAYER WHO LOST "Oh" CAN WIN GAME BECAUSE VICTORY OR DEFEAT IS DECIDED ON SUM POINTS OF PIECES AT THAT TIME. "Oh" HAS NO POINTS.

◇ ANOTHER PIECE-TAKING Shogi

- ○ GAME IS DONE WHITHOUT USING COMPETITOR'S OWN PIECES.
- ○ BASICALLY SAME AS Shogi RULE.
- ○ OVER 300 MOVES, PLAYERS OWN PIECES ARE USABLE AS "Mochi-Shogi".

Fig.35

○ ABOUT BIGINNER MODE

THIS IS INTENDED FOR USER WHO ARE BIGINNING Shogi PLAYERS, AND FOR FACILITATING UNDERSTANDING OF HOW Shogi IS FUN.

PLAYS USING PIECES AND ENTRANCE CORNER ARE ARRANGED SUCH THAT USERS JOIN GAMES WITH LIGHT HEART, IN ORDER TO FIND NEW USERS.

◇ PLAY WITH Shogi !

○ CHECKER LIKE GAME ON Shogi BOARD (SIMPLE RULE, BUT WIDE RANGE OF TACTICS) ONLY PIECES OF "Fu" ARE USED TO POT COMPETITOR'S PIECE BETWEEN PLAYER'S OWN PIECES.THIS IS MODIFIED LIKE GAME SOMEWAH.

○ GO-ROUND Shogi (USEFUL AS COMMUNICATION TOOL BECAUSE MANY USERS CAN PLAY TOGETHER) STARTING WITH "Fu" RANK OF PIECE INCREASES EVERY TIME PLAYER TAKES A ROUND OF BOARD PERIPHERY. PLAYER WHO FIRST RAISES TO "Oh" WINS GAME.

SERVER SIDE PROCESSING IS MINIMIZED BY LIMITING TO PERSON-TO-PERSON GAMES.

Fig.36

◇ *Shogi* ENTRANCE CORNER

○ EXPLAIN TERMS AND RULE OF *Shogi* TO VERY BIGINNER.
○ THIS FUNCTIONS AS GUIDE OF NORMAL GAMES, AND INCREASES *Shogi* FAN.
○ EASY-TO-JOIN ENVIRONMENT WILL BE PROVIDED BY DISPLAYING ON SCREEN SUCH AS PORTRAIT CHARACTERS OF PRO-*Shogi* PLAYERS SUBJECTED TO PEFORMATION, IN ADDITION TO LITERAL CHARACTERS.

Fig.37

○ ABOUT OTHER CONTENTS

PROPOSED CONTENTS INCLUDE "PRO-*Shogi* PLAYERS PROFILES" FOR PRESENTING PRO-*Shogi* PLAYER PROFILES. "WOMEN PRO-*Shogi* PLAYERS' CORNER" WILL BE OPENED TO PRESENT NEW IMAGE OF *Shogi*.
Takahashi, Yamato
Shimizu, Ichiyo (WOMEN'S THREE-TITLE-HOLDER)
ESPECIALLY POPULAR WOMEN PLAYERS' CORNER WILL BE OPENED FOR PUBLIC RELATIONS.

EXAMPLES OF CORNERS
○ "WEEKLY DIARY" CORNER PRESENTING EVERYDAY HAPPENING OF WOMENS PRO-*Shogi* PLAYERS IN FORM OF DIARY.

○ "*Shogi*-MEMO" BRIEFLY DESCRIBING "*Shogi* TERMS" INTENDED FOR BIGINNERS, WITH LOVELY PORTRAIT CHARACTERS OF WOMENS PRO-*Shogi* PLAYERS.

SERVER PROVIDING COMPETITIVE GAME SERVICE, PROGRAM STORAGE MEDIUM FOR USE IN THE SERVER, AND METHOD OF PROVIDING COMPETITIVE GAME SERVICE USING THE SERVER

FIELD OF THE INVENTION

The present invention relates to a server that provides a competitive game to users on network, a program storage medium for use in the server, and a method of providing a competitive game service using the server.

BACKGROUND OF THE INVENTION

Recently, a variety of information provision systems using network have been proposed to prepare information infrastructure.

Some of such information provision systems provides service to users, with which players at remote locations can play board games such as shogi (Japanese chess) and igo (Game of go) by using internet server, and a leased server and leased line for portable telephone, such as i-mode.

As typical representative of the system providing the board game service, there are techniques disclosed in Japanese Unexamined Patent Publication Nos. 56-3078 and 54-110033, and Publication of EP114210.

In the system disclosed in these Publications, a game player of a competitive game (a board game such as mah-jongg, shogi, igo, chess, or othelo) starts a personal computer (hereinafter referred to as a "PC") at the player's convenience to connect with a server through which the player can play the competitive game, thereby receiving the service.

However, against the system of the prior art, the following problems have been pointed out.

(1) It is seldom that the competitor is always present at the time of connect with the server. Therefore, the fact is that due to the absence of the competitor, the user often gives up receiving the competitive game service and releases the connection with the server. If this circumstance is frequent, the manager (administrator) of the server might lose the user (membership). From a cost standpoint, it is difficult to always guarantee a game player on access to the server.

(2) There is a competitive game in which the user can compete with the server side computer. It is equally true, however, that the user playing a game via a communication-line has such a potential desire that "he/she wants to enjoy the game with an actual human player." In addition, if the player of the communication-line competitive game knows that the competitor is the computer, it is meaningless to specially use the communication line because there is no difference with a game or consumer game that is already installed in a PC.

SUMMARY OF THE INVENTION

Accordingly, it is an object of the present invention to solve the above technical problem by providing a server providing a competitive game service which can solve inconveniences to both of the server side and the game player side as a user of the server, and a program storage medium used in the server, as well as a method of providing a competitive game service using the server.

The present inventor came up with the idea to solve the above problem as follows.

Specifically, a competitive game program and a virtual game player list are prepared in advance. It is set so that when a game player receives a competitive game service via a terminal on network, the competitive game program is activated to play the game with the game player under the condition that the number of competitors against the game player is below a predetermined number. As a competitor, a virtual game player's name on the virtual game player list is notified to the game player, who is to play the competitive game with the competitive game program.

With this construction, the game player can enjoy the competitive game with the virtual game player, even if the number of competitors is insufficient when receiving the competitive game service. This avoids that although the game player (user) gains access to the competitive game site for the purpose of playing the competitive game, the player cannot help giving up playing the game. Further, it is avoided that due to the absence of the competitor, the player reluctantly decides to play the competitive game with the computer, as in the case with the prior art. That is, when it is automatically judged that the number of competitors is below a predetermined number, a preset virtual player name is notified to start the game. Therefore, the game player may play the game without detecting the competitor is the computer. This prevents the game player's fight from being weakened. Also, the server side can provide such a competitive game environment where the competitive game is available at any time. It is therefore able to produce such a stage effect that the competitive game site appears to be always prosperous in the eyes of the game player as the user of the server.

In the meanwhile, the term "competitive game" is used herein in a comprehensive sense, i.e., to broadly refer to board games of mah-jongg, shogi, igo, chess, and othelo, besides shogi game between two players.

The notification of the virtual game player's name is performed as follows: (i) a number of game players lacking for the game are selected from a plurality of virtual game players previously entered on the virtual game player list; and (ii) as a competitor's name, the virtual game players' names of the selected game players are sent to the terminal of the game player.

This construction reduces the possibility of being detected that the competitor is the computer, even when the name of a game player who played with the user many times is notified again in the competitive game on network.

Preferably, a plurality of competitive game programs serving as a competitor are prepared in advance, or the difficulty (level) of a competitive game program is set automatically so that the competitive game program varies depending on the level of the competitor.

In particular, the possibility that the game player detects from the game pattern that the competitor is the computer, is further eliminated by preparing in advance plural game programs having different thinking routines and applying different competitive game programs to virtual game player' names.

The present invention, advantages in operating the same and aims which is attained by implementing the present invention will be better appreciated from the following detailed description of illustrative embodiment thereof, and the accompanying drawings.

BRIEF DESCRIPTION OF THE DRAWINGS

FIG. 13 is a diagram showing an example of "pro-shogi players' profiles" as simplified information provided to a portable telephone.

FIGS. 24 to 26 are diagrams showing, in simplified form, a display screen in the "aim at pro-shogi player!."

FIG. 29 is a diagram showing, in simplified form, a display screen of the ranking in the "title match."

FIG. 30 is a schematic diagram illustrating "tsume shogi."

FIGS. 31, 32 and 33 are diagrams showing, in simplified form, a display screen in the "shogi divination."

FIG. 34 is a schematic diagram illustrating other shogi games.

FIG. 35 is a schematic diagram illustrating information provided to the user in a beginner mode.

FIG. 36 is a schematic diagram illustrating "shogi entrance corner" provided to users.

FIG. 37 is a schematic diagram illustrating other contents that are provided from a server to users.

DESCRIPTION OF A PREFERRED EMBODIMENT

Preferred embodiments of an information provision system using a network according to the invention will now be described by referring to the accompanying drawings.

Construction of Information Provision System

Figure 1:
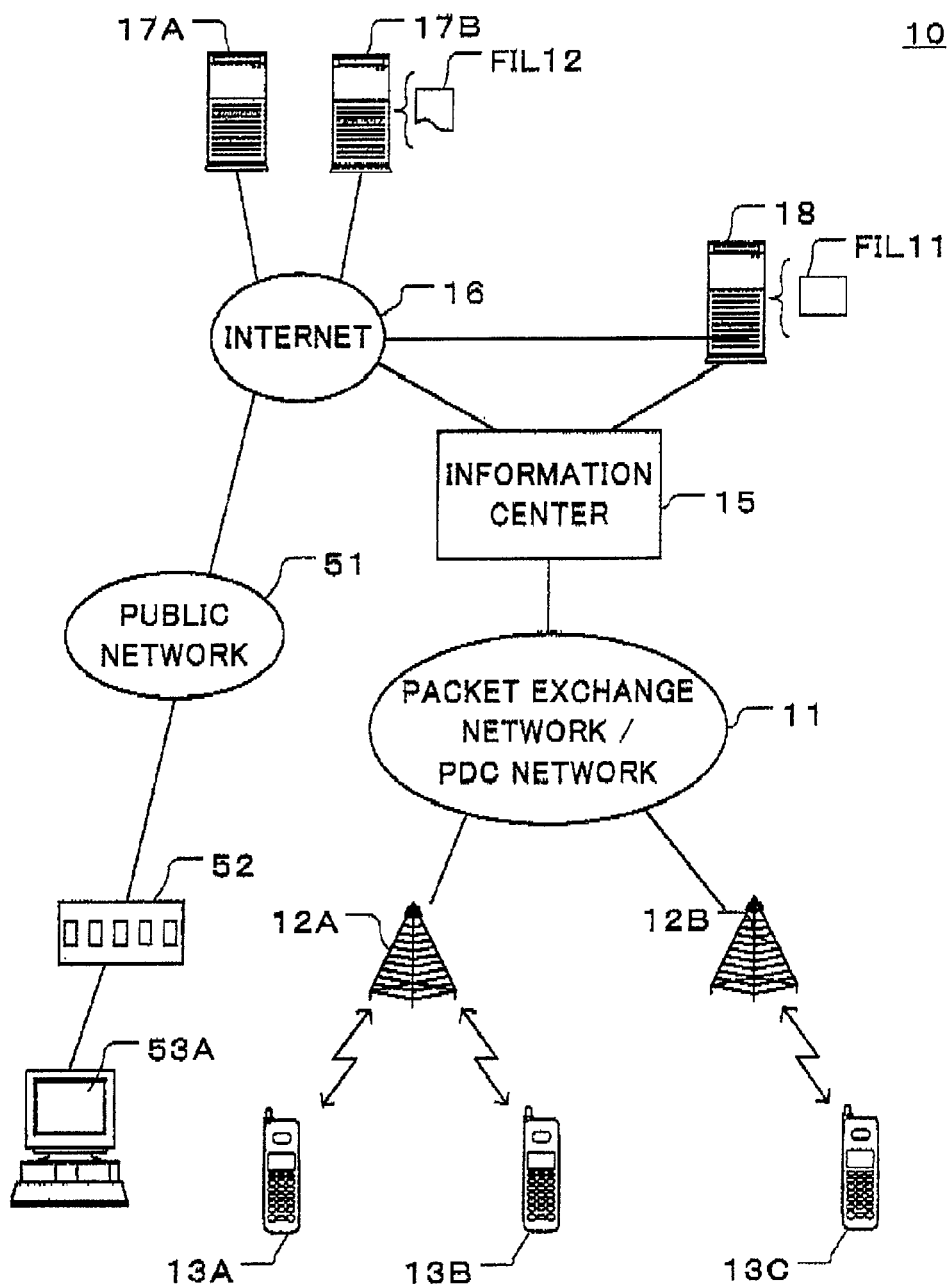
FIG. 1 is a diagram showing, in simplified form, the entire construction of an information provision system using a network according to one preferred embodiment of the invention.

Referring to FIG. 1, in an information provision system 10 according to one preferred embodiment, portable telephones 13A, 13B, 13C, . . . are connected via base stations 12A, 12B, . . . to packet exchange network/PDC (personal digital cellular) network 11. The respective portable telephones 13A, 13B, 13C, . . . can perform sending/receiving of voice data and character data with each other, via the packet exchange network/PDC network 11. As a sending/receiving mode of these data, there is employed, for example, time division multiplexing mode called "TDMA (time division multiple access)."

By packet communication, the portable telephones 13A, 13B, 13C, . . . can gain access to an information center 15 via the packet exchange network/PDC network 11, in addition to that they perform sending/receiving of voice data and character data with each other. In response to a request from the portable telephones 13A, 13B, 13C, . . . , the information center 15 obtains various information from information provision servers 17A and 17B connected to an internet 16, or from an information provision server 18 connected via a leased line, and distributes the information to the portable telephones 13A, 13B, 13C, . . . which sent the request. Thereby, the users possessing the portable telephones 13A, 13B, 13C, . . . can obtain the desired information from the information provision server (hereinafter merely referred to as a "server") 17A, 17B, or 18, irrespective of their whereabouts such as destination.

Each of the portable telephones 13A, 13B, 13C, . . . has the same construction.

Figure 2:
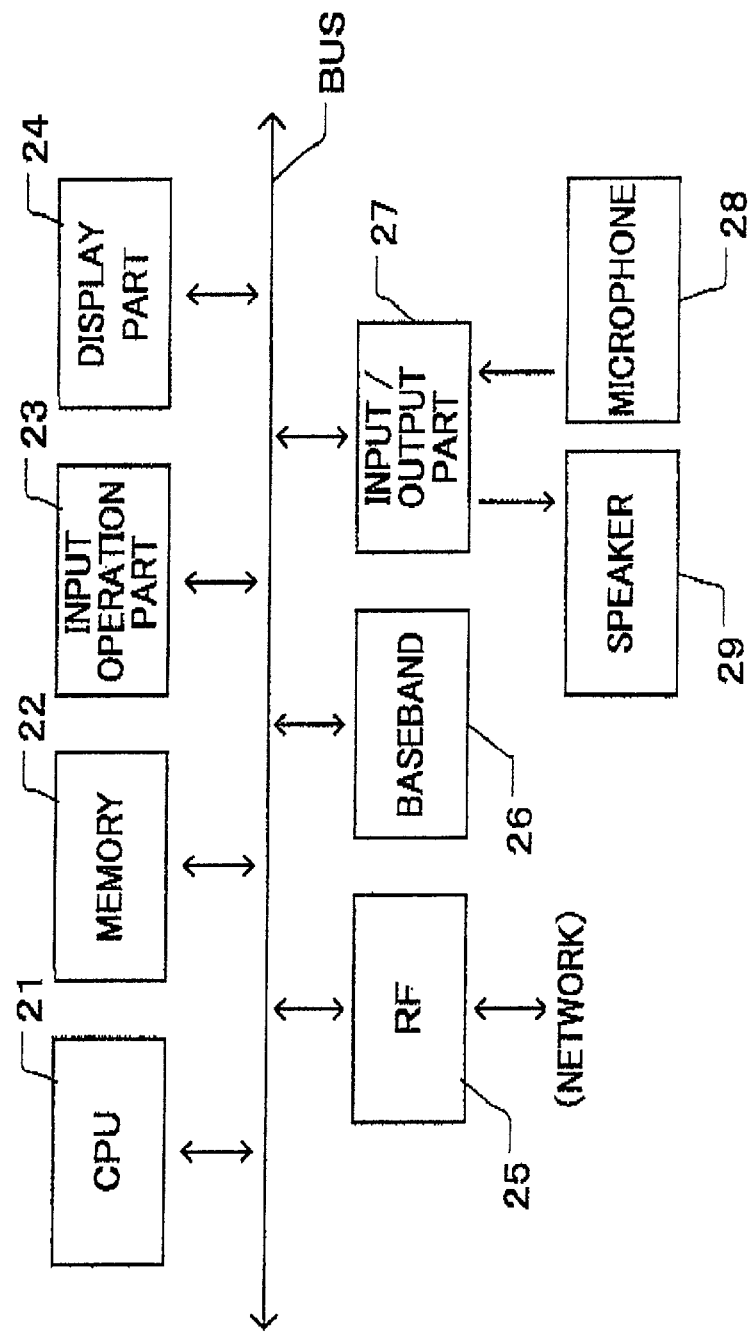
FIG. 2 is a block diagram showing an electric construction of a portable telephone.

Referring to FIG. 2, the portable telephone 13A has a data bus. To the data bus, there is connected (i) CPU 21; (ii) memory 22; (iii) send/receive circuit part 25 performing signal send/receive with the base stations 12A, 12B, . . . ; (iv) base band processing part 26 that converts RF (radio frequency) signals received by the send/receive circuit part 25 into vase band signals, and converts base band signals to be sent now into RF signals; (v) microphone 28; (vi) speaker 29; (vii) input/output part 27 that is interface with the microphone 28 and speaker 29; (viii) display part 24 composed of a liquid crystal display panel etc.; and (ix) input operation part 23 containing a keyboard and jog dial.

The CPU 21 executes a variety of operations according to operation programs stored in the memory 22, and controls the above components according to the corresponding operation. The contents of an individual processing of the CPU 21 are displayed on the display part 24, as required.

When the user inputs the telephone number of the desired call destination, the input operation part 23 gives data indicating the telephone number to the CPU 21. The CPU 21, then, sends a connection request via the send/receive circuit part 25 to the call destination indicated by the telephone number that the user inputted. At this time, the packet exchange network/PDC network 11 connects a line according to the response of the call destination. When the line is connected, the send/receive circuit part 25 gives the RF signals from the call destination, which is received via an antenna, to the base band processing part 26. Upon receipt of the RF signals, the base band processing part 26 converts the RF signals into base band signals. After completing this signal conversion, the base band processing part 26 gives the base band signals to the input/output part 27. Upon receipt of the base band signals, the input/output part 27 outputs via the speaker 29 the voice signals from the call destination, as voice.

When the user inputs voice via the microphone 28, the input/output part 27 gives input voice signals (base band signals), which has been sent from the microphone 28, to the base band processing part 26. Upon receipt of the base band signals, the base band processing part 26 converts the base band signals into RF signals. After completing this conversion processing, the base band processing part 26 sends the RF signals via the send/receive circuit part 25 to the packet exchange network/PDC network 11, thereby sending the RF signals to the call destination connected on line to the packet exchange network/PDC network 11.

Thus, the users operating the portable telephones 13A, 13B, 13C, . . . can make conversation with other user as the call destination, via the portable telephone.

When the user inputs various information (containing character information and specific selection information) by operating the input operation part 23, the CPU 21 converts the input information into packet data and then sends the packet data to the packet exchange network/PDC network 11 via the base band processing part 26 and send/receive circuit part 25. The packet exchange network/PDC network 11 sends the received packet data to the information center 15. On the other hand, the packet data information to be sent from the information center 15 via the packet exchange network/PDC network 11 is superimposed to RF signals. The signals in this state are fetched in send/receive circuit part 25 and base band processing part 26, by which the packet data are assembled into the original data format and given to the display part 24. The data that is restored to the original format is then displayed on the display part 24.

Thus, the users using the portable telephones 13A, 13B, 13C, . . . can perform sending/receiving of various information with the information center 15 that is the connection destination.

Further, by previously performing entry on a variety of contents provided by the servers 17A, 17B and 18, the users operating the portable telephones 13A, 13B, 13C, . . . can join such contents when they have access to the information center 15.

Specifically, the information center 15 fetches a variety of information from the servers 17A, 17B and 18, in response to the request from the portable telephone 13A, 13B, 13C, . . . , and sends the fetched information to the portable telephone 13A, 13B, 13C, . . . , which sent the request. The portable telephone 13A, 13B, 13C, . . . , which received the information, stores the provision information sent from the server 17A, 17B, or 18, in the memory 22 and then displays it on the display part 24. The user (player) using the portable telephone 13A, 13B, 13C, . . . can further obtain the desired information from the server 17A, 17B, or 18, by operating the input operation part 23 (e.g., the operation of selecting one of choices indicated in character which are displayed on the display part 24 as part of the provision information), while observing the provision information (containing image information and character information, etc.) displayed on the display part of the individual portable telephone 13A, 13B, 13C, . . . The result of the player's input is sent via the packet exchange network/PDC network 11 to the information center 15, and then transferred to the server 17A, 17B, or 18, by the information center 15.

To a public network 51, a personal computer (hereinafter referred to as a "PC") 53 is connectable via a modem 52. The PC 53 can access to the server 17A, 17B and 18, via the public network 51 and internet 16. That is, the PC 53 can obtain a variety of provision information from the servers 17A, 17B, and 18.

The server 18 has the same construction as the servers 17A and 17B, except that the server 18 is connected to the information center 15 via the internet 16.

Figure 3:
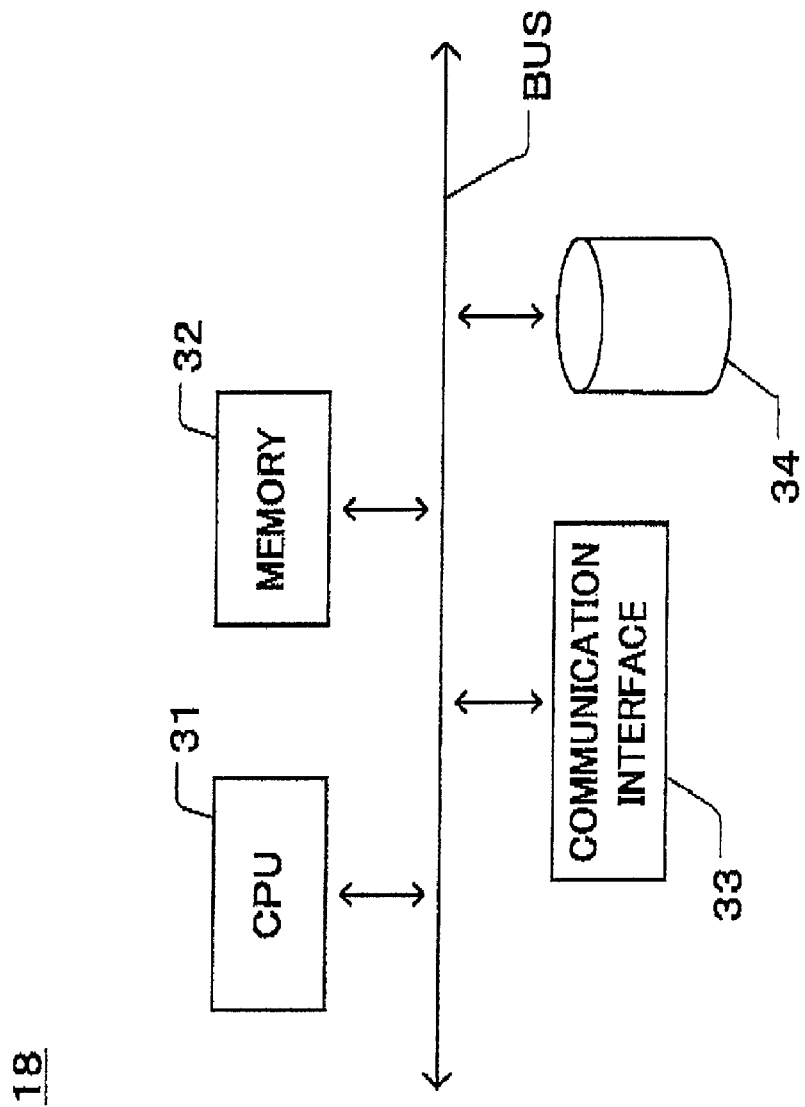
FIG. 3 is a block diagram showing an electric construction of a server.

Referring to FIG. 3, the server 18 has a data bus, to which is connected (i) CPU 31, (ii) memory 32, (iii) communication interface 33, and (iv) data base 34.

The CPU 31 executes a variety of processing according to a program stored in the memory 32, and an input aided program to be described later.

Specifically, the CPU 31 receives information from the portable telephones 13A, 13B, 13C, . . . , which are sent from the information center 15 via a leased line connected by the communication interface 33, and then stores the received information in the memory 32. These information contain, for example, the results of selections that the users selected from the choices presented to the users via the portable telephones 13A, 13B, 13C, . . . , in response to the provision information. That is, these information are information sent from the portable telephones 13A, 13B, 13C, . . . when these are operated by their respective users.

The CPU 31 reads out a program (containing the input support program) stored in the data base 34 to the memory 32. According to the program, the CPU 31 progresses the program based on the information indicating the result of the user's operation that is stored in the memory 32. The progress result of the program is stored in the data base 34.

In the information provision system 10 of this preferred embodiment, the servers 17A, 17B, and 18 store the provision information to the portable telephones 13A, 13B, 13C, . . . in the data base 34. In this instance, the display part 24 of each portable telephone 13A, 13B, 13C, . . . has an extremely limited display space alone in consideration of its portability. Therefore, the contents of information that is provided from the server 17A, 17B, or 18 to the each portable telephone 13A, 13B, 13C, . . . is simplified information corresponding to the display space of the display part 24.

That is, the above information uses description language (called "HTML for i-mode", and hereinafter referred to as a "simplified HTML"), in accordance with compact HTML (hereinafter referred to as a "C-HTML"), which is a subset of HTML (hyper text markup language). The simplified HTML is obtained by leaving only tags that can be reflected on the display part having the limited space in the tags of the HTML, and cutting away the rest. Therefore, information for portable telephone that is described in the above-mentioned language (hereinafter referred to as a "simplified information") can also be displayed on a web browser for PC that can display information described in HTML. When displaying a simplified HTML by the portable telephones 13A, 13B, 13C, . . . , tags not defined in the simplified HTML are merely ignored, without causing any error. It is therefore able to display information described in HTML even on the portable telephones 13A, 13B, 13C, . . . Thus, both of HTML and simplified HTML are description languages having compatibility each other.

Both of simplified information described in the simplified HTML and information described in HTML, which are related to the same contents, are stored in different files in the same or different servers 17A, 17B, and 18. As a method of designating the file, notation using key information called "URL (uniform resource locator)" is used. The URL is a standard addressing method for identifying a resource on internet, and is a character string consists of three elements of schema name, host name and file name. The scheme name designates a transfer protocol name. In the case of WWW, "http" is used as its scheme name. The URL designates uniquely one resource on internet, and used as WWW page address.

The simplified information described in simplified HTML is basically provided to the portable telephones 13A, 13B, 13C, . . . This simplified information is available when the user has access by designating the menu preset to the portable telephones 13A, 13B, 13C, or by inputting URL. On the other hand, the information described in HTML is to be provided to the PC 53. This information is available when the user has access by designating URL on the PC 53.

In the simplified information provided to the portable telephones 13A, 13B, 13C, . . . , URL (key information) indicating the address of detail information related to the simplified information contents is described so as to accompany the simplified information contents. In the file specified by the URL, further detail information is described which is related to the simplified information describing the URL.

Figure 4:
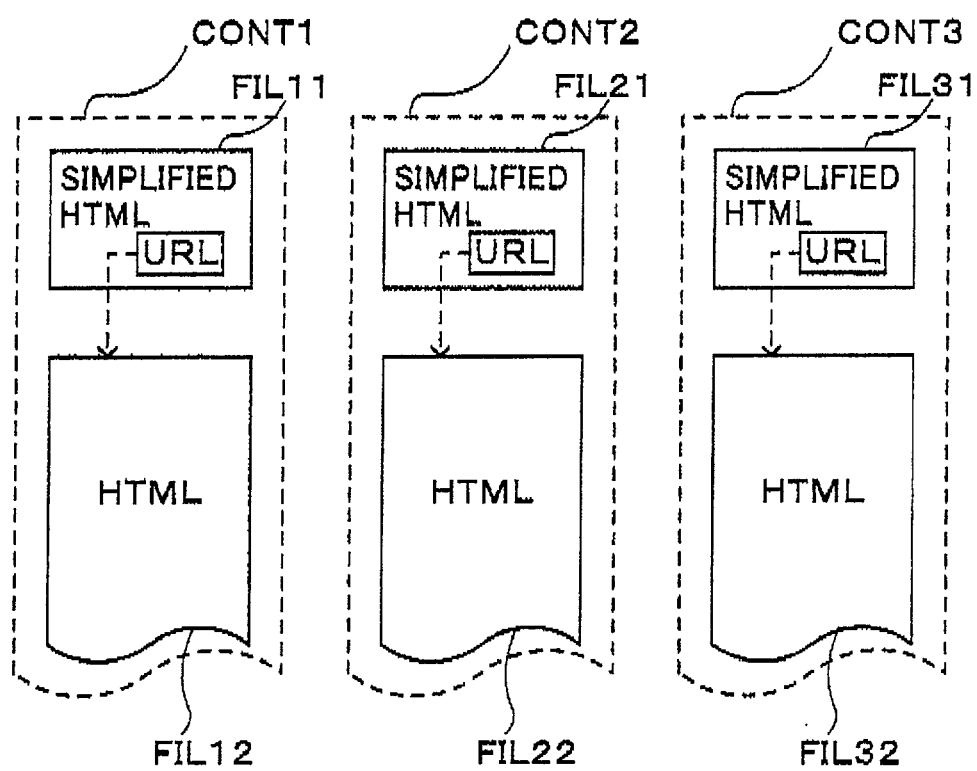
FIG. 4 a diagram showing, in simplified form, the relationship between a simplified information file and a detail information file.

FIG. 4 shows the relationship between the file of the simplified information described in simplified HTML and the file wherein more detail information than the simplified information is described in HTML. Referring to FIG. 4, for example, one contents CONT1 consists of (i) file FIL11 wherein simplified information such as outline and header are described in simplified HTML, and (ii) file FIL12 wherein information such as detail description and image are described in simplified HTML. The files FIL11 and FIL12 are not necessarily required to be stored in the same server. For instance, as shown in FIG. 1, the files FL11 and FL12 may be stored in the servers 18 and 17B, respectively.

Figure 5:
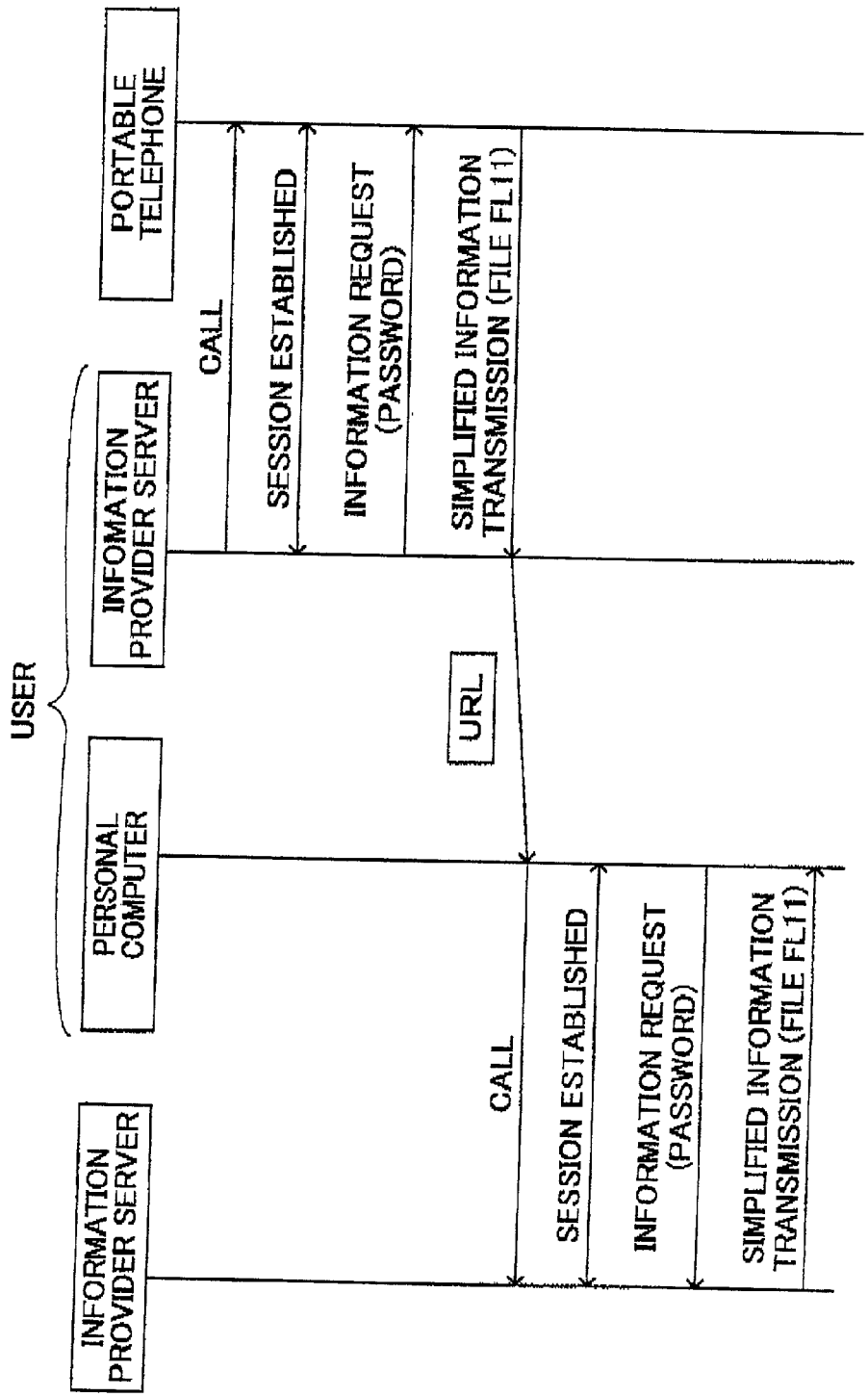
FIG. 5 is a timing chart showing a procedure of providing the information of an information selection system.

Referring to FIG. 5, when the user has access to the server 18 with the portable telephone 13A and downloads the file FIL11 to the portable telephone 13A, the portable telephone 13A calls the information center 15 (server 18) via the packet exchange network/PDC network 11, for the purpose of securing a channel.

When the channel is secured, the portable telephone 13A establishes a session by an information send/receive means with the portable telephone 13A and requires simplified information to the information center 15 (server 18). As the information send/receive means with the portable telephone 13A, there are, for example, PPP (point to point protocol) processing and WAP (wireless application protocol). On this occasion, the portable telephone 13A sends both of information for specifying terminal and address information for specifying information required at that time. The information for specifying terminal consists of (i) a password previously stored in the memory 22 with the portable telephone 13A, (ii) terminal identification information (data indicating portable telephone (PDC)), (iii) information for specifying calling means (PDC), (iv) the telephone number of the portable telephone 13A, (v) information of protocol such as WAP used when making connection, and (vi) a variety of option data.

Based on the request signal and password sent from the portable telephone 13A, the information center 15 reads the simplified information from the server 18, and sends the read simplified information to the portable telephone 13A that is the origin of the request signal. As a result, the simplified information read from the data base 34 according to the control program of the server 18, is displayed on the display part 24 of the portable telephone 13A.

The CPU 31 executes the control program that was read from the data base 34 of the server 18 to the memory 32, thereby realizing (i) the display control of the screen that is displayed on the display part 24 of the portable telephone 13A, and (ii) the operation that information that the user inputted via the display screen is sent from the portable telephone 13 to the server 18, and this information is stored in the data base 34 and managed by the server 18. The CPU 21 of the portable telephone 13A has the function of displaying on the display screen the image and character information provided from the server 18, and sending the information that the user inputted via the resulting display screen to the server 18.

On receipt of the simplified information provided from the server 18 to the portable telephone 13A in the above manner, the user can enjoy the contents provided as simplified information (e.g., the contents about shogi). It is difficult to display such further detail information that the user demands in the contents, on such a small space as the display part 24 of the portable telephone 13A. Therefore, such information is not provided as simplified information. This requires that the user observe such detail information with a large amount of information on the PC 53 via a predetermined site.

Specifically, the address (URL) of the detail information is displayed in the simplified information provided from the server 18 to the portable telephone 13A. The URL is address information of a HTML file that contains further detail information about the items on the simplified information list. The user receives the detail information on the PC 53 by using the address information displayed on the display screen of the portable telephone 13A.

Accordingly, the user inputs the address information (URL) received by the portable telephone 13A to the PC 53, and has access from the PC 53 to the server 17B that stores the file FIL12 containing the detail information, as shown in FIG. 5. For the purpose of securing a channel, the PC 53 via the public network 51 calls the server 17B specified by the URL.

When the channel is secured, the PC 53 establishes a session with information send/receive means with the PC 53, and requires detail information to the server 17B. As example of the information send/receive means with the PC 53, there are PPC processing and WAP. In this instance, the PC 53 sends the server 17B information for specifying terminal together with a request signal. The information for specifying terminal consists of (i) a password previously stored in the memory with the PC 53, (ii) terminal identification information (the PC 53 identification data), (iii) information for specifying calling means, (iv) the telephone number of the PC 53, and (v) a variety of option data.

Based on the request signal from the PC 53, the server 17B sends the PC 53 the detail information of the specified file FIL12. As a result, the detail information provided from the server 17B is displayed on the display part of the PC 53. This detail information is information described in HTML, containing information that is too much to display in such a small display space as the display part 24 of the portable telephone 13A. With this detailed information, the user observes information next to the simplified information that the user received via the portable telephone 13A.

Thus, the user can receive via the PC 53 the detail information as needed, by the following constructions: (i) information forming one contents is divided into simplified information that can be received by the portable telephone 13A, and detail information that can be received by the PC 53, and (ii) address information (URL) of the next detail information is written to the simplified information received by the portable telephone 13A.

Information Provision on Shogi Site

The server 18 provides information about shogi (Japanese chess) and a variety of contents including user-participation game services, as simplified information to the portable telephones 13A, 13B, 13C, . . . The program for providing these contents is stored in the memory 32 with the server 18. The CPU 31 executes this program so that the image data stored in the data base 34 is read and distributed. Contents provision to the portable telephones 13A, 13B, 13C, . . . is performed in the manner that the program of a game (game between two players/competitive game) stored in the data base 34 is expanded (developed) on the memory 32 and this game program is executed by the CPU 31. The program for providing the contents and the game program may be stored in other program storage medium, such as a magnetic disk.

Examples of the contents about shogi are (i) "shogi world news" providing topics and notification about shogi world, (ii) "formal game flash" providing weekly the schedule and results of major games, as flush news, (iii) "pro-shogi table appreciation" providing shogi table data of formal pro-shogi games, (iv) "shogi divination" practicing divination of the user, (v) "next move" quizzing the user on the next move that becomes a winning move, (vi) "shogi school" explaining the rule and terms of shogi, (vii) "aim at pro-shogi player" though which the user experiences the path toward pro-shogi player in RPG fashion, (viii) "pro-shogi players' profiles" providing career summary of pro-shogi players, and (ix) "game room" through which the user plays game with other users. The server 18 provides a series of contents in response to the request from the user (portable telephones 13A, 13B, 13C, . . . ).

Figure 6:
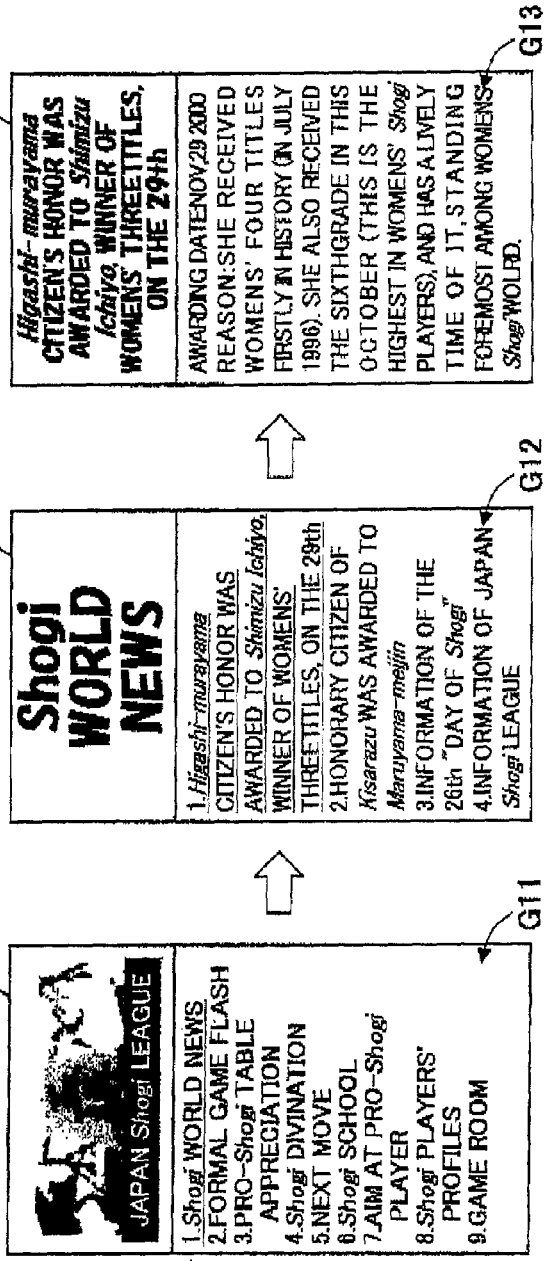
FIG. 6 is a diagram showing an example of "shogi world news" as simplified information provided to a portable telephone.

When the user inputs a connection request to the shogi site by operating the input operation part 23 of the portable telephone 13A, the telephone 13A has access to the server 18 via the packet exchange network/PDC network 11 and information center 15. Then, the portable telephone 13A displays information downloaded from the server 18 on the display part 24, so that a display screen related to the shogi site appears on the display part 24 of the telephone 13A, as shown in FIG. 6.

The user can select the desired menu on top page screen G 11 of the above display screen.

When the user selects the "shogi world news" that is the first menu, the portable telephone 13A sends the server 18 a signal requesting service of the "shogi world news." In response to this, the server 18 sends the portable telephone 13A data of the "shogi world news" that is stored in the data base 34 and updated as needed. As a result, a screen G12 of the "shogi world news" is displayed on the display part 24 of the portable telephone 13A. When the user selects one from the items displayed on the screen G12, the contents of the selected news is downloaded from the server 18 and displayed on the display part 24, as news contents screen G13.

Figure 7:
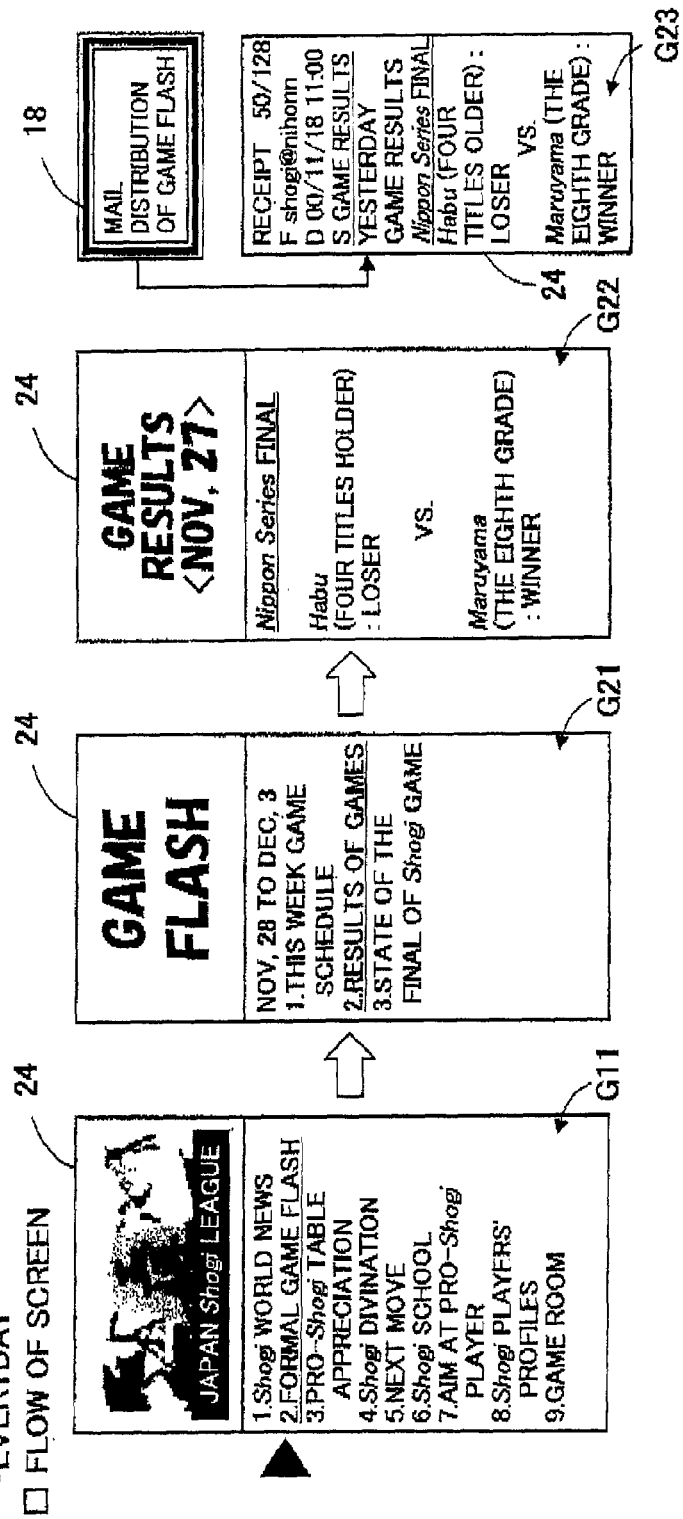
FIG. 7 is a diagram showing an example of "formal shogi game flash" as simplified information provided to a portable telephone.

Referring to FIG. 7, when the user selects the "formal game flush" that is the second menu on the top page screen G11, the portable telephone 13A sends the server 18 a signal requesting service of the "formal game flush." In response to this, the server 18 sends the portable telephone 13A data of the "formal game flush" that is stored in the data base 34 and updated as needed. As a result, a screen G21 of the "formal game flush" is displayed on the display part 24 of the portable telephone 13A. When the user selects one from the items displayed on the screen G21, the selected game result is downloaded from the server 18 and displayed on the display part 24, as game result screen G22. In this instance, every time the data of "formal game flush" stored in the data base 34 is updated, the server 18 provides the latest data to the portable telephone 13A with electronic mail service. Therefore, the user of the portable telephone 13A can observe the formal game result through electronic-mail receive screen G23, without access to the shogi site.

Figure 8:
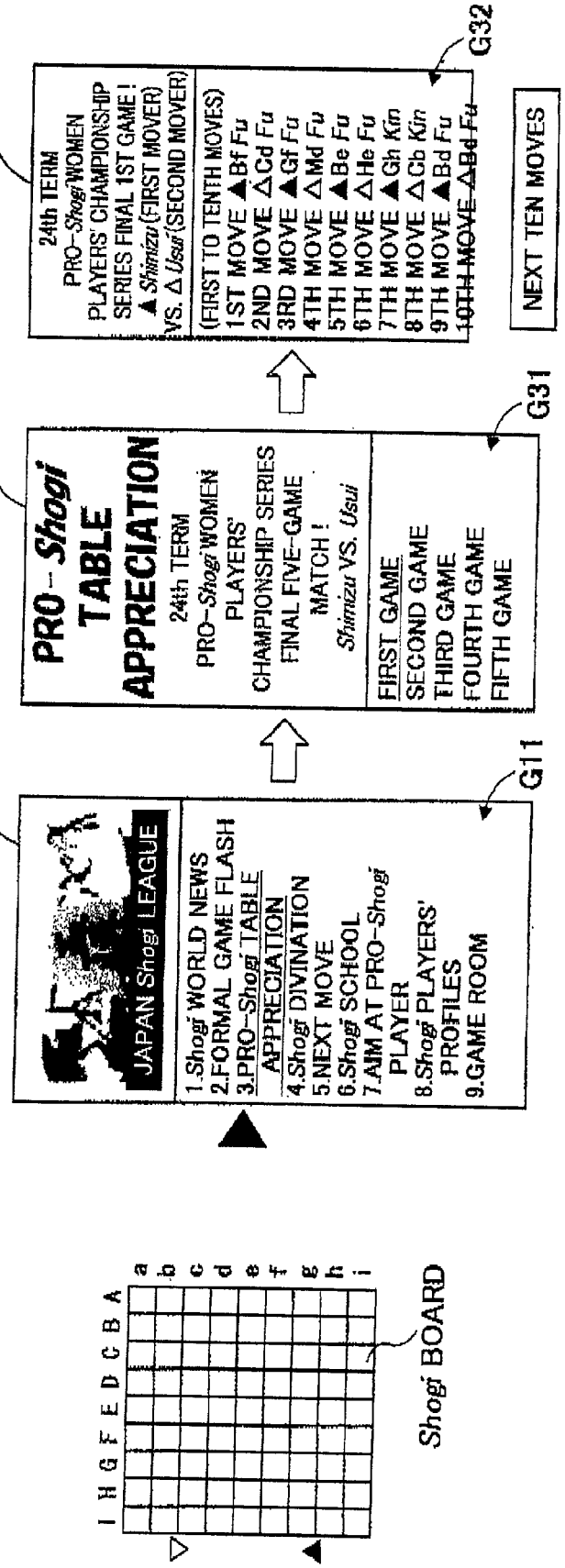
FIG. 8 is a diagram showing an example of "pro-shogi table appreciation" as simplified information provided to a portable telephone.

Referring to FIG. 8, when the user selects the "pro-shogi table appreciation" that is the third menu on the top page screen G11, the portable telephone 13A sends the server 18 a signal requesting service of the "pro-shogi table appreciation." In response to this, the server 18 sends the portable telephone 13A data of the "pro-shogi table appreciation" that is stored in the data base 34 and updated as needed. As a result, a screen G31 of the "pro-shogi table appreciation" is displayed on the display part 24 of the portable telephone 13A. When the user selects one from the games displayed on the screen G31, the selected shogi-table data is downloaded from the server 18 and displayed on the display part 24, as shogi- table data screen G32.

Figure 9:
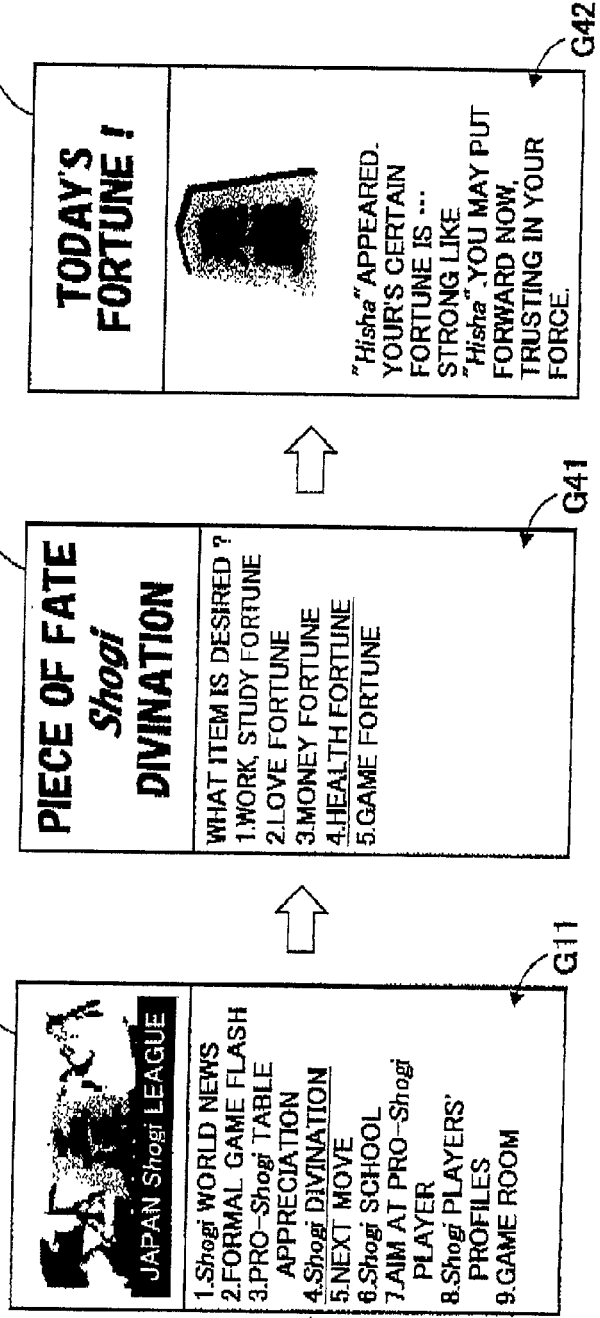
FIG. 9 is a diagram showing an example of "shogi divination" as simplified information provided to a portable telephone.

Referring to FIG. 9, when the user selects the "shogi divination" that is the fourth menu on the top page screen G11, the portable telephone 13A sends the server 18 a signal requesting service of the "shogi divination." In response to this, the server 18 sends the portable telephone 13A data of the "shogi divination" that is stored in the data base 34 and updated as needed. As a result, a screen G41 of the "shogi divination" is displayed on the display part 24 of the portable telephone 13A. When the user selects one from the items displayed on the screen G41, the server 18 tells the user's fortune by executing the divination program based on the user's personal information such as date of birth (previously registered in the data base 34). The result of the divination is sent to the portable telephone 13A and displayed on the display part 24, as divination result screen G42.

Figure 10:
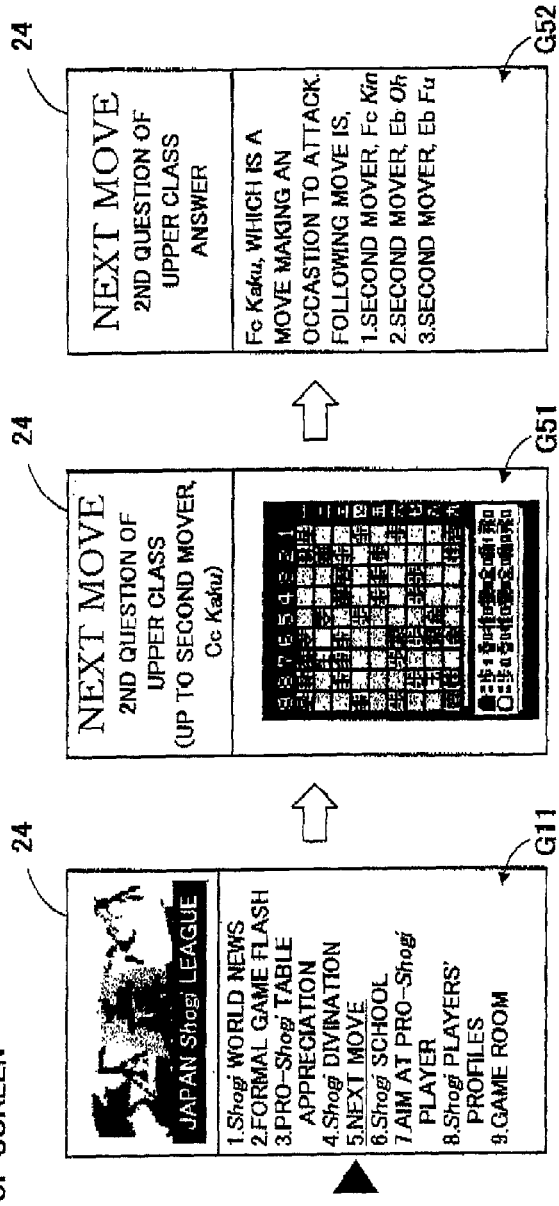
FIG. 10 is a diagram showing an example of "next move" as simplified information provided to a portable telephone.

Referring to FIG. 10, when the user selects the "next move" that is the fifth menu on the top page screen G11, the portable telephone 13A sends the server 18 a signal requesting service of the "next move." In response to this, the server 18 sends the portable telephone 13A a question of the "next move" that is stored in the data base 34. As a result, a question screen G51 is displayed on the display part 24 of the portable telephone 13A. It should be noted that the image of a shogi-board on the question screen G51 cannot be displayed at one time in the limited space of the display part 24 of the portable telephone 13A. It is required that the user observe the screen while scrolling it. When the user decides and inputs the next move from the state of the shogi-board on the screen G51, the inputted answer (the next move) is sent from the portable telephone 13A to the server 18. The server 18 judges whether the user's answer is correct or not, and stores the judgment result in the data base 34. The server 18 also sends a right answer to the portable telephone 13A, thereby displaying a right answer screen G52 on the display part 24 of the telephone 13A.

Figure 11:
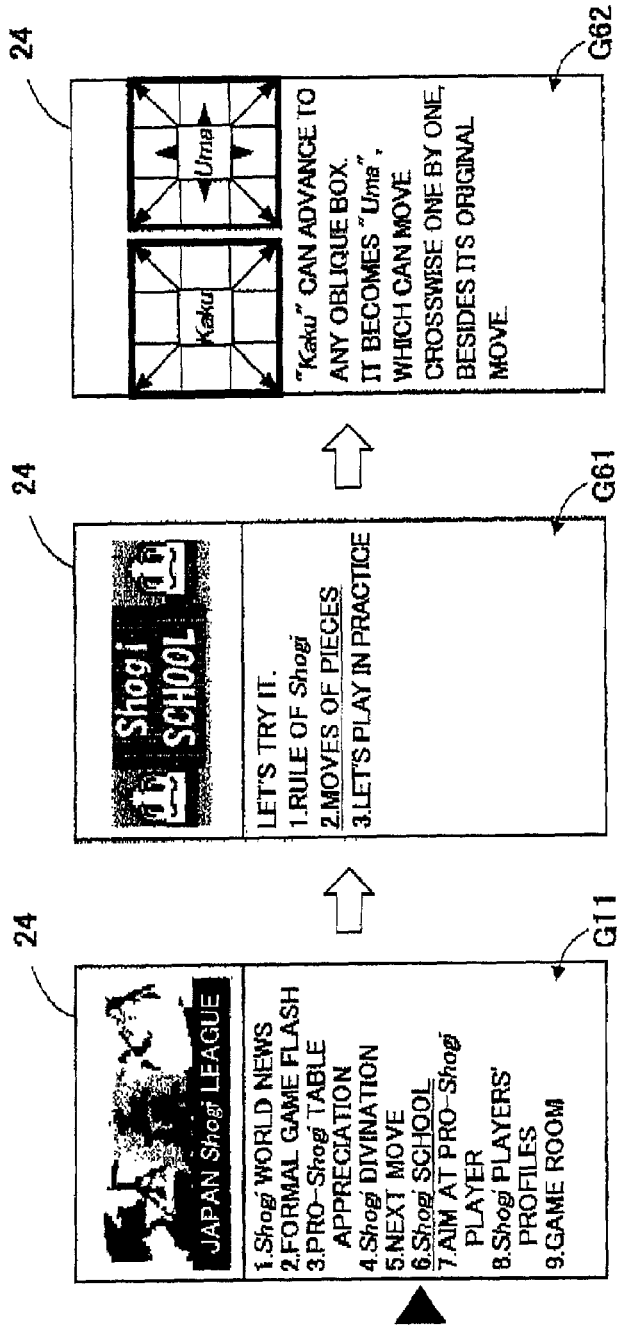
FIG. 11 is a diagram showing an example of "shogi school" as simplified information provided to a portable telephone.

Referring to FIG. 11, when the user selects the "shogi school" that is the sixth menu on the top page screen G11, the portable telephone 13A sends the server 18 a signal requesting service of the "shogi school." In response to this, the server 18 sends the portable telephone 13A data of the "shogi school" that is stored in the data base 34. As a result, a shogi-school screen G61 is displayed on the display part 24 of the portable telephone 13A. When the user selects one of the items on the screen G61, the server 18 reads from the data base 34 the explanation data corresponding to the selected item and sends the read explanation data to the portable telephone 13A. As a result, an explanation screen G62 is displayed on the display part 24 of the portable telephone 13A.

Figure 12:
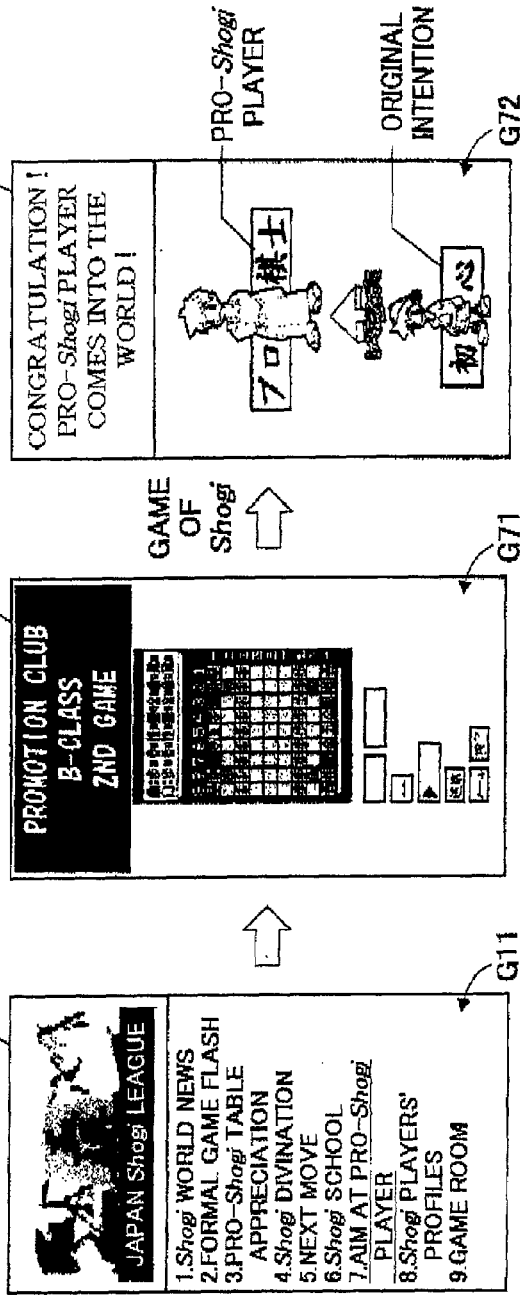
FIG. 12 is a diagram showing an example of "aim at pro-shogi player!" as simplified information provided to a portable telephone.

Referring to FIG. 12, when the user selects the "aim at pro-shogi player!" that is the seventh menu on the top page screen G11, the portable telephone 13A sends the server 18 a signal requesting service of the "aim at pro-shogi player!" In response to this, the server 18 sends the portable telephone 13A data of the "aim at pro-shogi player!" that is stored in the data base 34. As a result, screen G71 of the "aim at pro-shogi player!" is displayed on the display part 24 of the portable telephone 13A. When the user answers a question on the screen G71, the answer is sent from the telephone 13A to the server 18. It should be noted that the image of a shogi-board on the question screen G71 cannot be displayed at one time in the limited space of the display part 24 of the portable telephone 13A. It is required that the user observe the screen while scrolling it. The server 18 marks the user's answer and enters the user on the class corresponding to the score. Thereafter, the server 18 sets a game between the user and a player set on the program, so that the user plays the game on the display part 24 of the portable telephone 13A. The user is promoted depending on the result of the game. If the user progresses favorably, pro-shogi player title-holder screen G72 is finally displayed on the display part 24. This shows that the user is qualified as pro-shogi player. Service of the "aim at pro-shogi player!" will be fully described later.

Referring to FIG. 13, when the user selects the "pro-shogi players' profiles" that is the eighth menu, the portable telephone 13A sends the server 18 a signal requesting service of the "pro-shogi players' profiles." In response to this, the server 18 sends the portable telephone 13A data of the "pro-shogi players' profiles" that is stored in the data base 34 and updated as needed. As a result, a screen G81 of the "pro-shogi players' profiles" is displayed on the display part 24 of the portable telephone 13A. When the user selects one from pro-shogi players displayed on the screen G81, the profile of the selected pro-shogi player is downloaded from the server 18 and displayed on the display part 24, as profile contents screen G82.

When the user selects the "game room" that is the ninth menu, the portable telephone 13A sends the server 18 a signal requesting service of the "game room." In response to this, the server 18 sends the portable telephone 13A data of the "game room" that is stored in the data base 34. As a result, a screen of "game room" to be described later is displayed on the display part 24 of the portable telephone 13A. Games with other user or computer are available when the user joins the game room through the screen of "game room."

Description of "Game Room"

Figure 14:
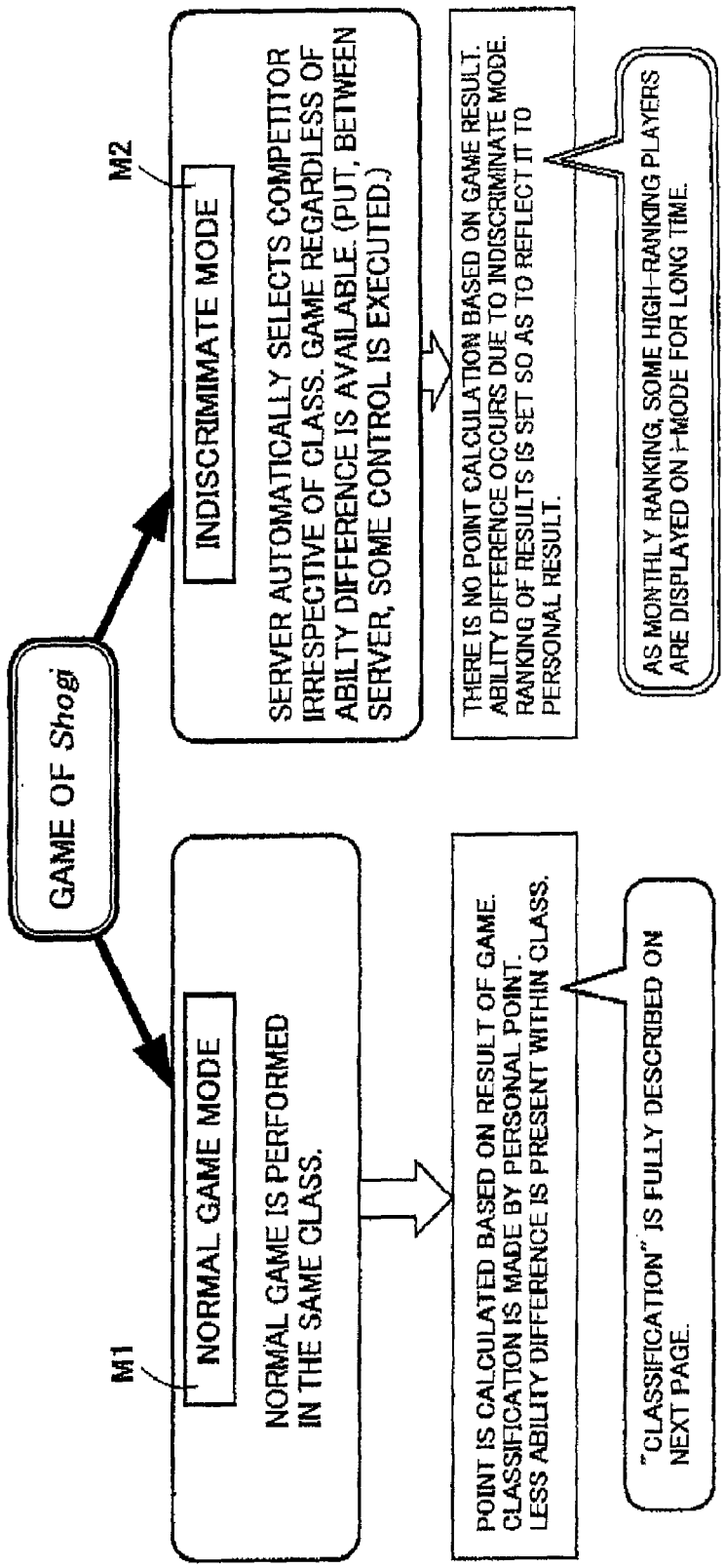
FIG. 14 is a schematic diagram illustrating two game modes of shogi.

Referring to FIG. 14, as "game room," a normal game mode M1 and indiscriminate mode M2 are prepared by the server 18. The term "normal game mode" is the mode that the user entering the game room plays a competitive game with a competitor of the same class (strength/level) as the user. The term "indiscriminate mode" is the mode that the server 18 selects a competitor irrespective of the class.

Figure 15:
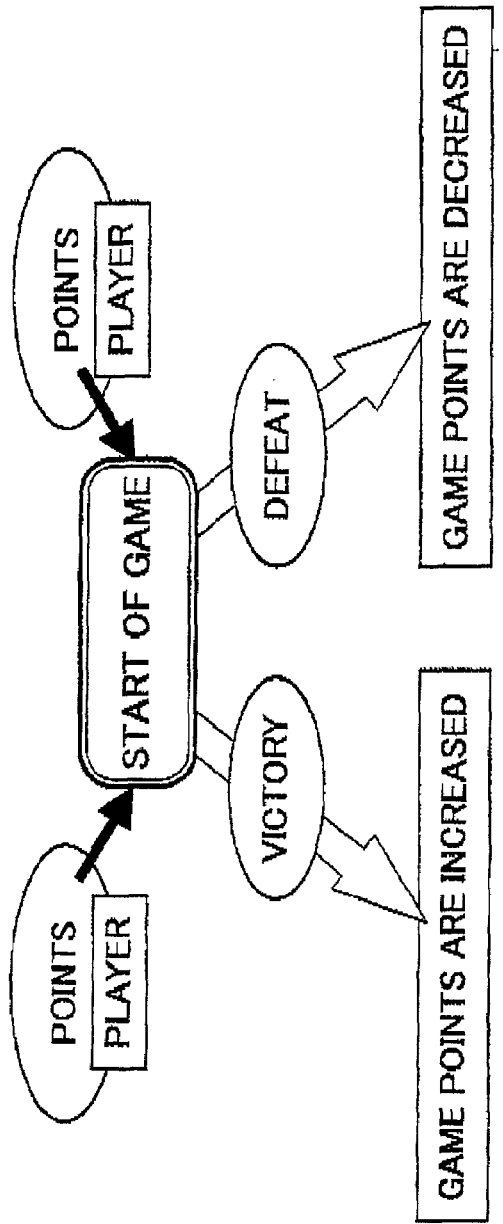
FIG. 15 is a schematic diagram illustrating a method of shogi game.
Figure 16:
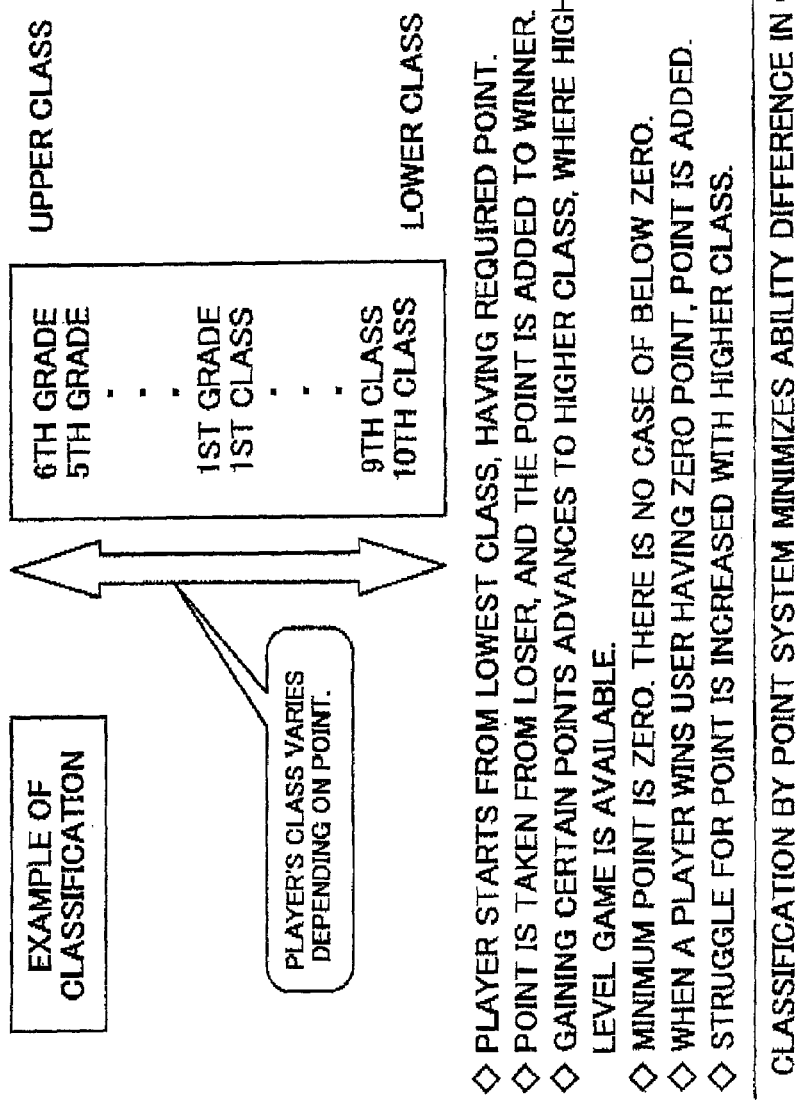
FIG. 16 is a schematic diagram illustrating classification based on the results of shogi games.

When the user selects the game mode on the display part 24 of the portable telephone 13A, the result of selection is sent to the server 18. Upon this, the server 18 selects a competitor according to the selected game mode. When the user selected the normal game mode M1, the server 18 selects a competitor of the same class. The class is decided based on the user's point that is increased or decreased according to the game result every time the user plays game, as shown in FIG. 15. In the initial state, the user receives a required point and starts with the lowermost class (10th grade) as shown in FIG. 16.

Figure 17:
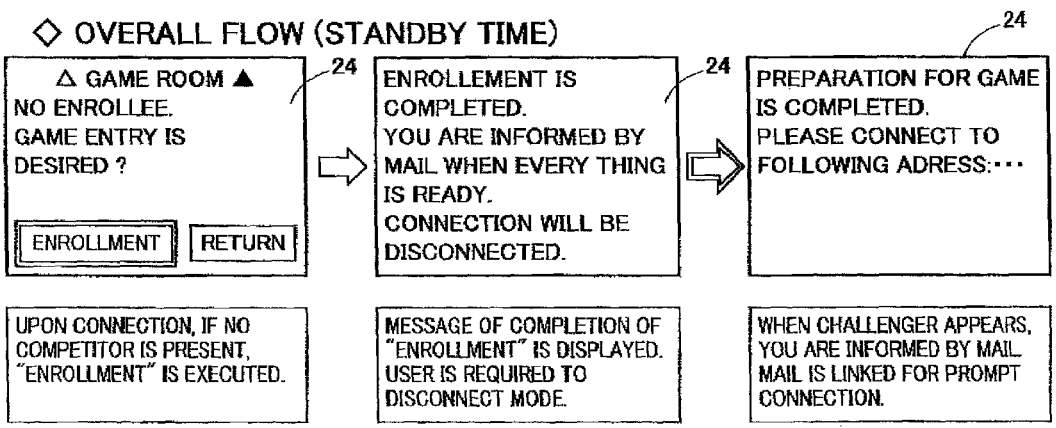
FIGS. 17 and 18 are diagrams showing, in simplified form, a display screen in a "game room."
Figure 18:
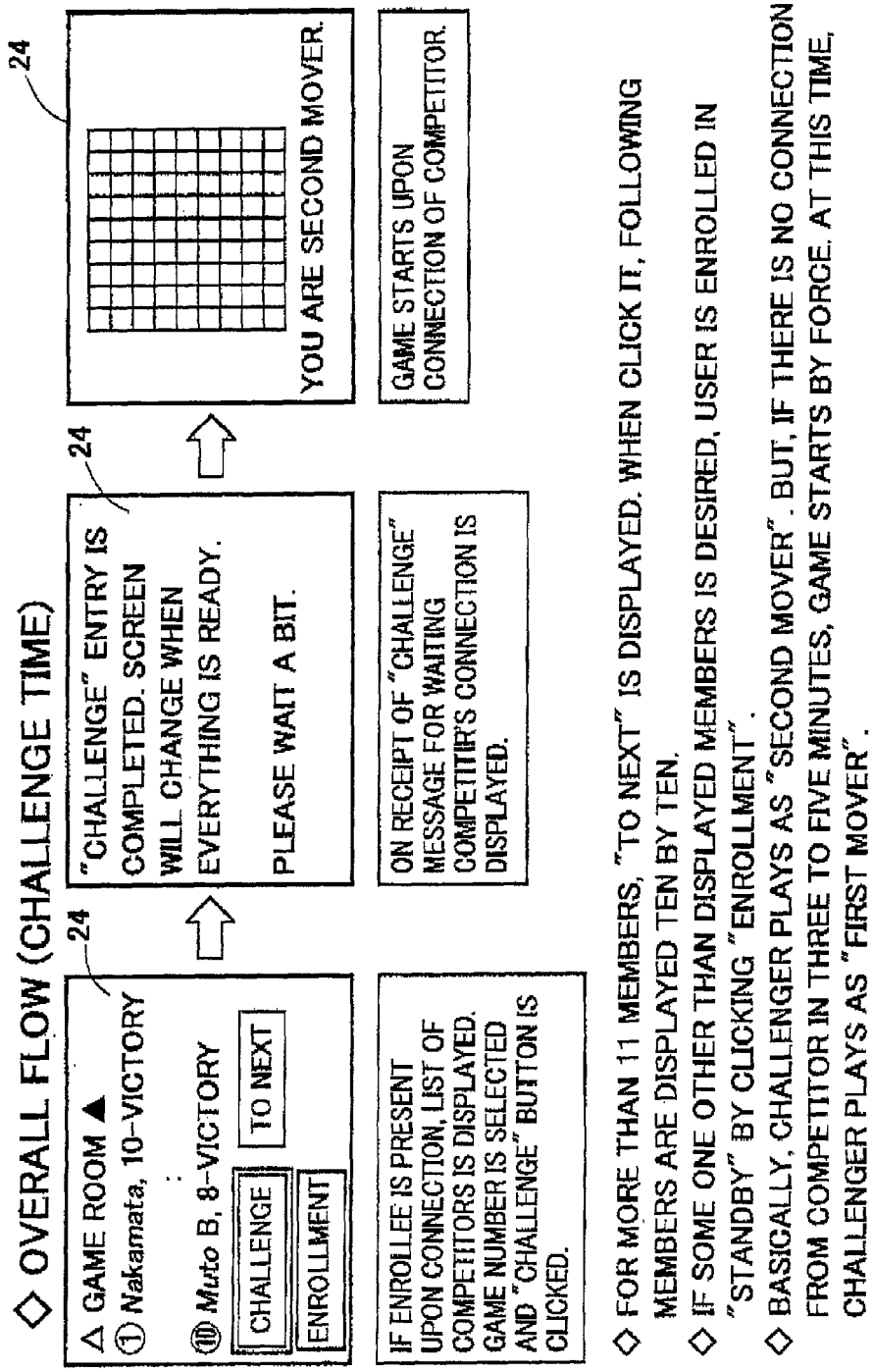

Referring to FIGS. 17 and 18, the "game room" has (i) "standby mode" that in the absence of competitor, the user is on standby (FIG. 17); and (ii) "challenge mode" that in the presence of competitors on standby, the user selects the desired competitor to play game together from the standby list (FIG. 18).

In the "standby mode" shown in FIG. 17, to the message "No enrollee. Game entry is desired?" on the display part 24 of the portable telephone 13A, when the user selects "Enrollment," the display of the display part 24 is changed to the message that "Enrollment is completed. You are informed by mail when everything is ready." Then, connection is discontinued temporally, so that the user is registered on a competitor list (data base 34). On the other hand, when other user enters the "game room" and designates a standby user on the competitor list, the message that preparation for game is completed is sent with electronic mail service from the server 18 to the portable telephone 13A of the standby user.

Specifically, an electronic mail message that "Preparation for game is completed. Please connect the following address." is displayed on the display part 24 of the portable telephone 13A. The address presented at this time is the address of a site (server) for playing game. In this preferred embodiment, the user can play game with the server 18.

In the "challenge mode" shown in FIG. 18, when the standby user is present, the standby user's name (pen name or handle name) is sent from the server 18 to the portable telephone 13A. In this instance, when the user selected the "normal game mode" M1, the server 18 selects a competitor of the same class as the user from the standby users, and enters the selected competitor's name on a game standby list L11. When the user selected the "indiscriminate mode" M2, the server 18 enters all of the game standby users on the game standby list L11.

Thus, based on the game standby list L11 presented on the portable telephone 13A, the user selects the desired competitor and the result of selection is sent to the server 18. On receipt of this, the server 18 starts a game between the user and the competitor selected by the user in accordance with a predetermined game program.

In this game program, in consideration of the fact that the game is played between the users' portables telephones, data described in simplified HTML that complies with their limited display space is used in data sending/receiving between the server 18 and the users (competitors).

On receipt of the data described in simplified HTML, the portable telephone 13A displays on the display part 24 the situations of the game to such an extent that it is possible to express in the simplified HTML. In this embodiment, it is difficult to display on the display part 24 the entire shogi board at one time because the display space of the display part 24 is limited. It is required that the user confirm the situations of the entire shogi-board by scrolling the screen of the display part 24 on which the shogi-board appears.

In the case that the user fails to obtain a competitor immediately in the standby mode shown in FIG. 17, or that the number of standby competitors is below the required number in the challenge mode shown in FIG. 18, the server18 sets the necessary number of virtual players in accordance with the competitive game program. This is one of characteristic features of the present invention.

Figure 19:
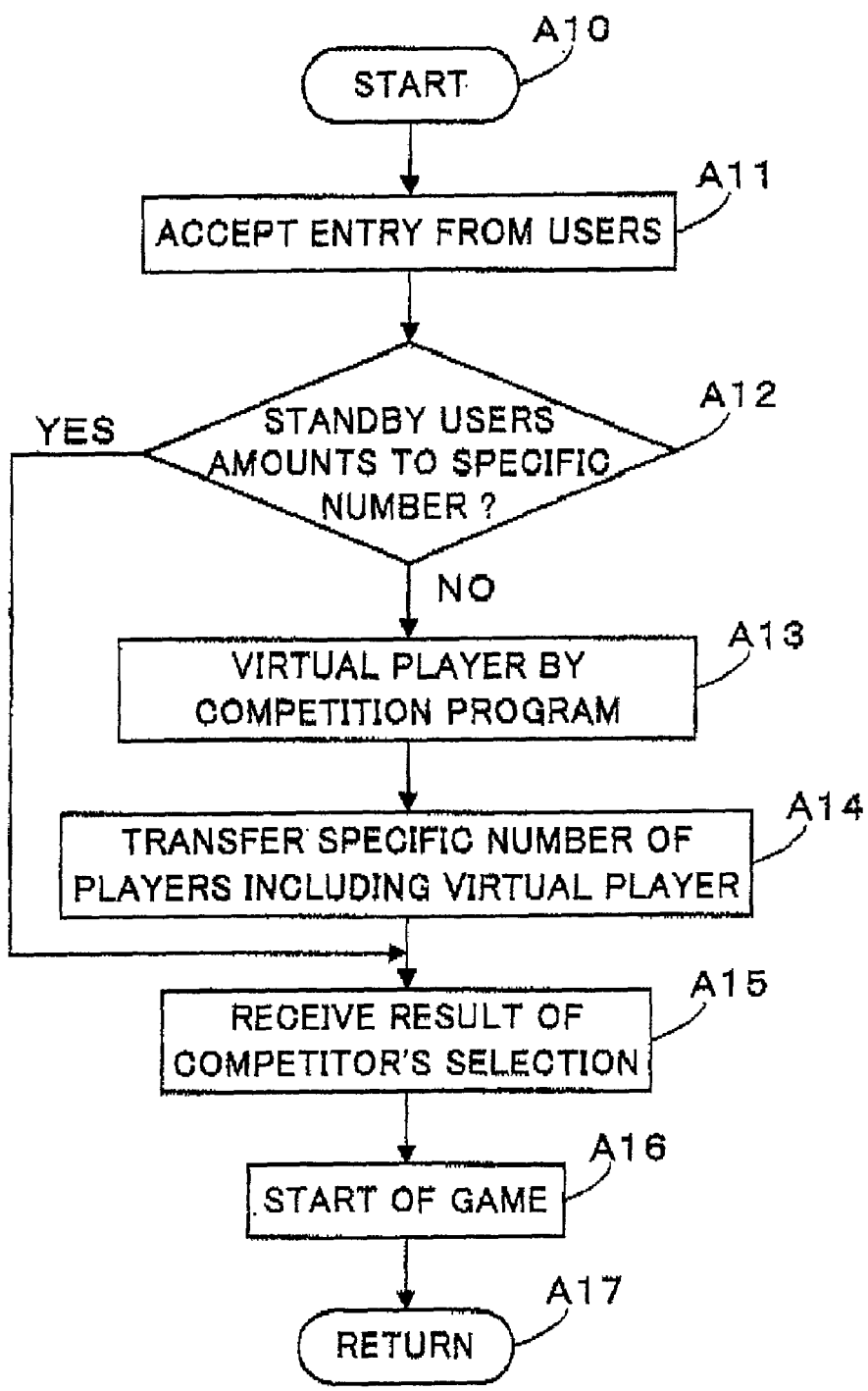
FIG. 19 is a flowchart showing the flow of processing for providing a game standby list.

Specifically, referring to FIG. 19, when the user joins the shogi site, the server 18 starts with the step A10 of processing the standby list L11, and executes the processing of step A11. Thus, the server accepts entry for game from users. At this stage, when the user joins the "game room" to make application for game, the server 18 executes the processing of step A12. At this time, the server 18 counts the number of players on the standby list L11 and judging whether or not the number of standby players reaches the required number.

In step A12, when there is negative response (i.e., the number of standby players is below the required number), the server 18 executes the processing of step A13. Thus, the server 18 sets the necessary number of virtual players in accordance with the competitive game program. In this instance, when the user waiting for a competitor selected the "normal game mode" M1, the server 18 sets a virtual player of a level (strength) equal with this user. When this user selected the "indiscriminate mode" M2, the server 18 sets a virtual player at random, irrespective of this user's level/strength.

After setting the virtual player, the server 18 executes the processing of step A14. Thus, the server 18 sends the virtual player's information set in step A13 to the portable telephone 13A of the user waiting for a competitor. If no player is present on the standby list L11, in the standby state shown in FIG. 17, connection between the portable telephone 13A and the server 18 is discontinued temporally. Immediately thereafter, the server 18 sets a virtual player and sends the portable telephone 13A the information, that preparation for game is completed, with electronic mail. At this time, information, that the presented competitor is a virtual player set in accordance with the competitive game program, is not sent to the portable telephone 13A, in order to make the user believe (recognize) that the presented competitor is the actual player. On the other hand, if some players are present on the standby list L11, the server 18 adds the necessary number of virtual players for satisfying the required number to the standby list L11 of FIG. 18, so that this information is sent to the portable telephone 13A. Also in this instance, information, that the presented competitor is a virtual player set in accordance with the competitive game program, is not sent to the portable telephone 13A, in order to make the user believe (recognize) that the presented competitor is the actual player.

Thereafter, when the user selects the desired competitor from the standby list L11 that is displayed on the display part 24 of the portable telephone 13A, the telephone 13A sends the result of selection to the server 18.

In step A15, the server 18 receives this selection result, i.e., the competitor (player) selected by the user. Then, the server 18 executes the processing of step A16. Thus, the server 18 starts the competitive game program. Thereby, the user enjoys the competitive game with the competitor, via the server 18.

The result of the competitive game (shogi table) is to be stored in the data base 34 of the server 18, and it is reproducible in compliance with the wish of the user.

When the competitive game in step A16 is ended, the server 18 executes the processing of step A17 and returns processing to step A17 (i.e., returns to control routine for executing the shogi site).

Therefore, the user in the "game room" can quickly obtain a competitor and enjoy the competitive game. Even if the competitor is a virtual player, the user will recognize that the presented competitor is the actual player. Accordingly, the user can always obtain the real ambience of playing game with the actual human player.

Figure 20:
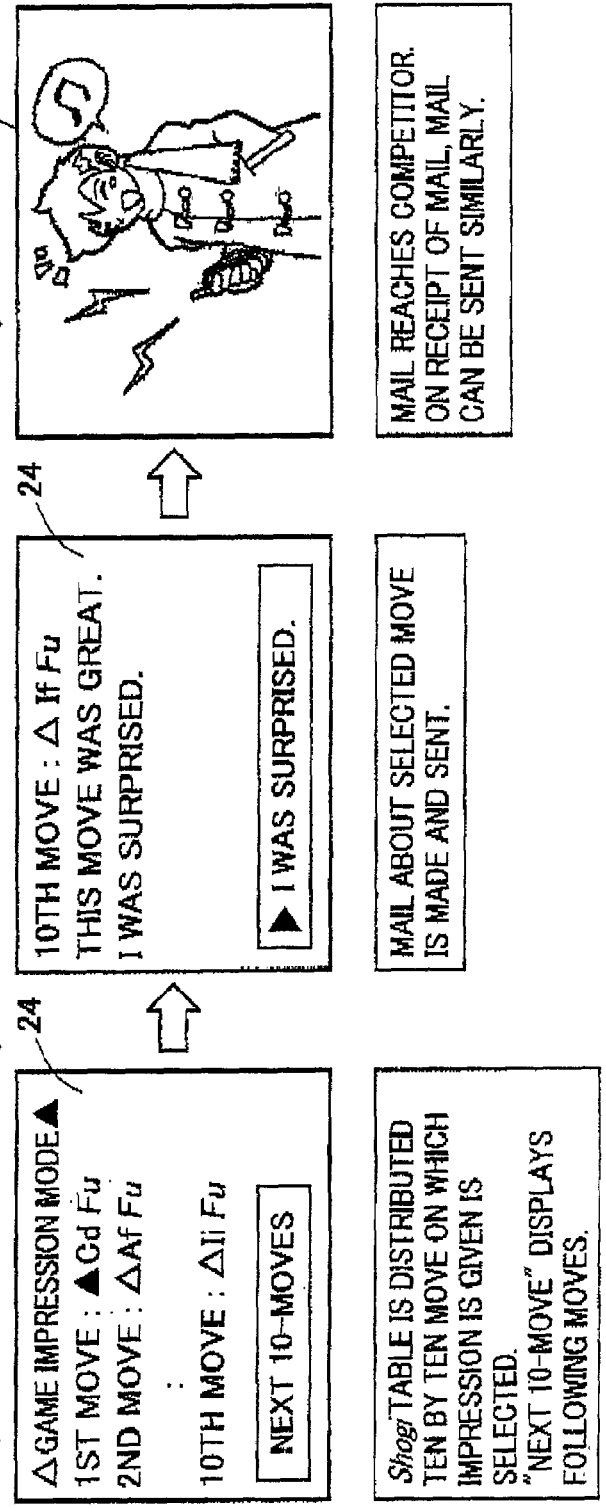
FIGS. 20 and 21 are diagrams showing, in simplified form, a display screen in "game impression mode."

After the competitive game, the user can observe the competitive game result (shogi table) by downloading it from the server 18, as shown in FIG. 20.

For the competitive game with the actual human competitor, the user can exchange opinions with the competitor about this competitive game by sending the competitor an impressive "move" and the user's impression thereon with electronic mail.

Figure 21:
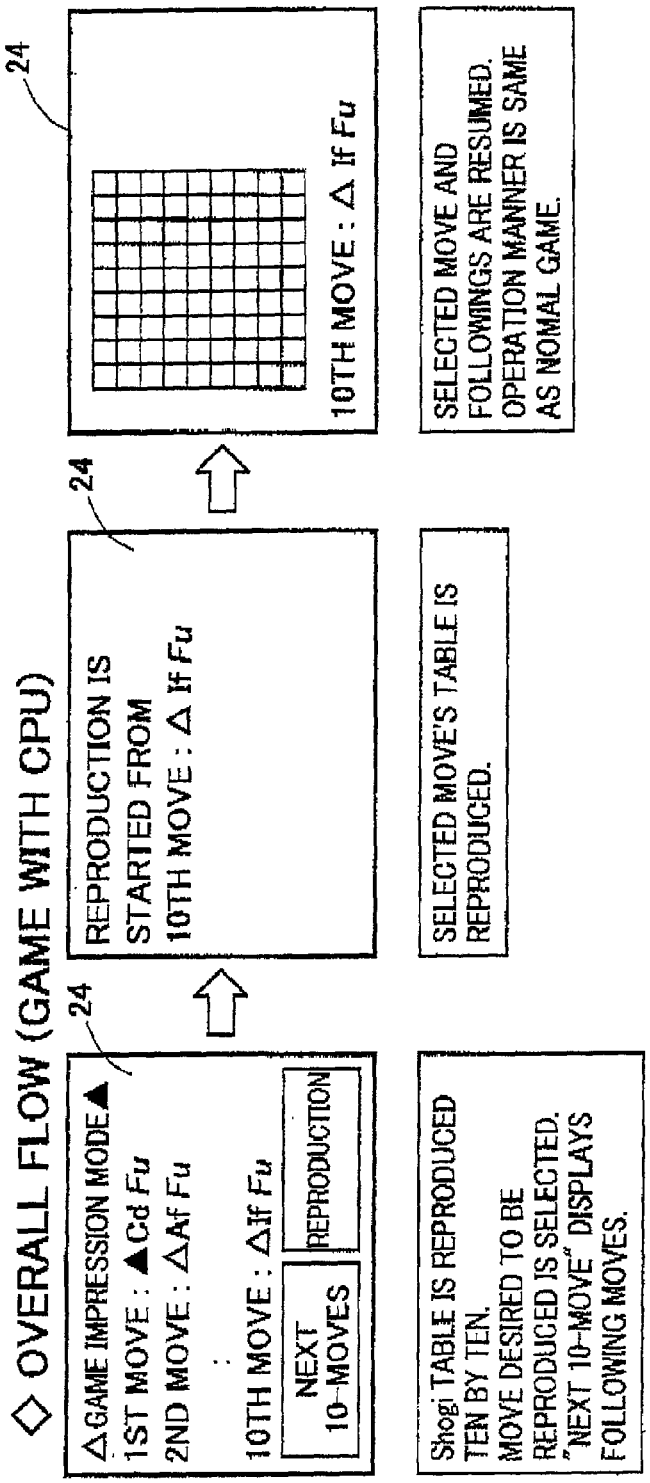

Referring to FIG. 21, a competitive game with a virtual player is reproducible move by move, so that the user restarts the competitive game with the virtual player from a certain move. The user can study his/her ways to move by replacing a certain move with a different move during such reproduction of the competitive game. Even when the competitor of the reproduced competitive game is the actual human, such replacement of move is realized by making computer be competitor.

Reproduction of the competitive game with the portable telephone 13A is achieved by data (simplified HTML) that complies with the limited display space of the telephone 13A. In the information provision system 10 of this preferred embodiment, the above reproduction is achievable with a terminal device having a large display screen as PCs.

Figure 22:
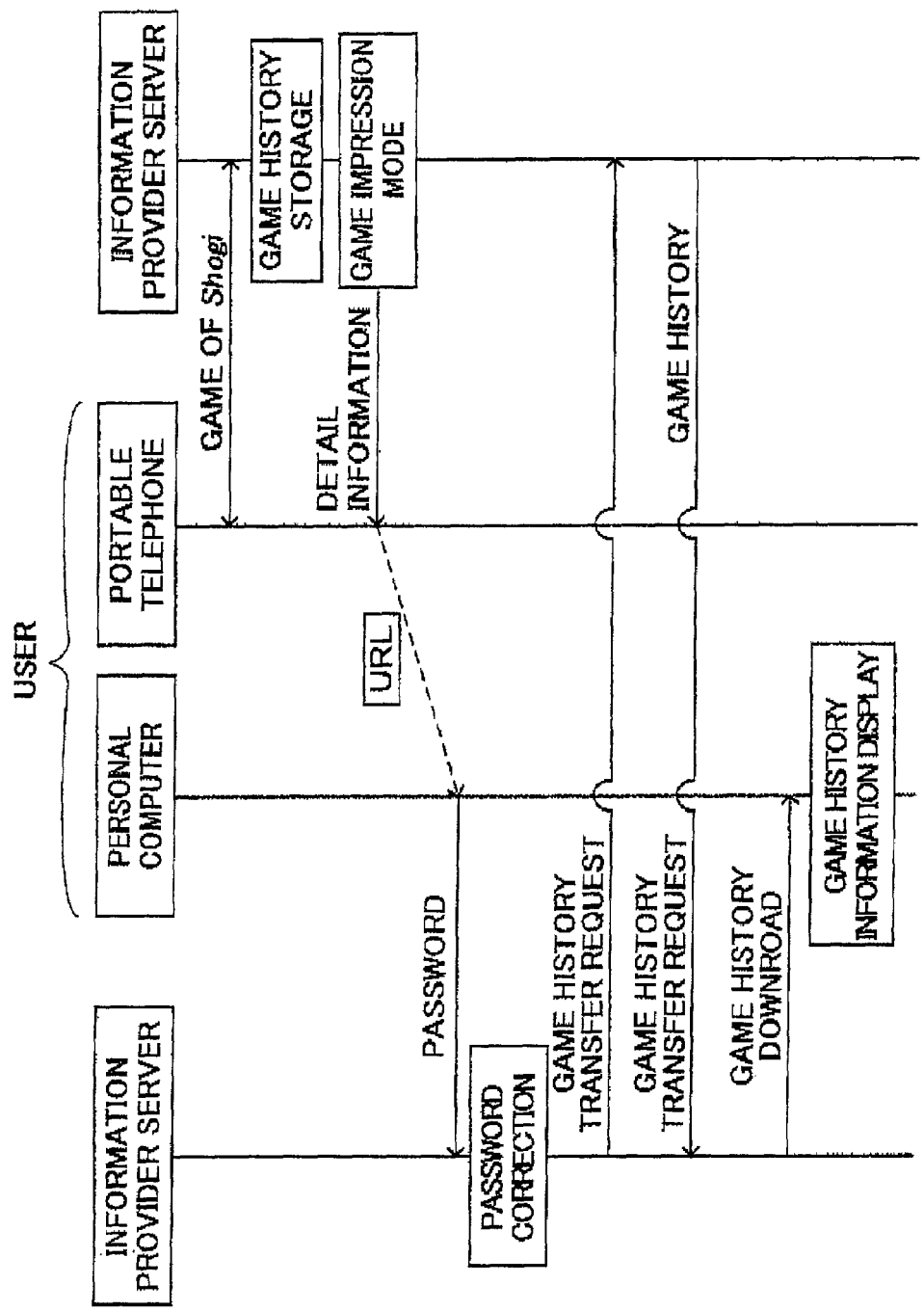
FIG. 22 is a timing chart when downloading a detail information to a personal computer.

Specifically, referring to FIG. 22, when on the portable telephone 13A, the user plays a competitive game with other player or plays the competitive program, via the server 18, the result of the competitive game is stored in the different files with the server's data base 34, as simplified data and detail data, respectively.

Thereafter, when the user selects the competitive game's reproduction ("game impression mode"), the server 18 sends the portable telephone 13A the URL of the file storing detail data for performing detail reproduction of the competitive game. This URL is displayed on the display part 24 of the telephone 13A.

Based on this, when the user inputs to the PC 53 the above URL and the user's password, the PC 53 sends the inputted URL and password to the server 17A having a connection contract with the PC 53. In response to this, the server 17A compares the received password with the previously registered password. If they agree, the server 17A judges that a legal user has access, and sends a transmission request for data of the file specified by the URL (i.e., data that reproduce the comparative game in detail (the comparative game history), to the server specified by the received password and URL (the server 18 in this preferred embodiment). The detail data may be stored in other server.

On receipt of the transmission request of the detail data, the server 18 transfers this data to the server 17A that is the origin of the request. The server 17A receives the detail data and downloads it to the PC 53, so that the downloaded detail data is displayed on the PC 53.

As a result, the large display screen of the PC 53 is composed of the detail data that the reproduction of the competitive game is described with HTML format. The screen reproducing the detail data displays, for example, the game-playing-face of a shogi board in detail and one time, and individual shogi pieces in fine image. The user can review the competitive game while observing this screen, or paper on which this screen is printed out.

Description of "Aim at Pro-Shogi Player!"

Figure 23:
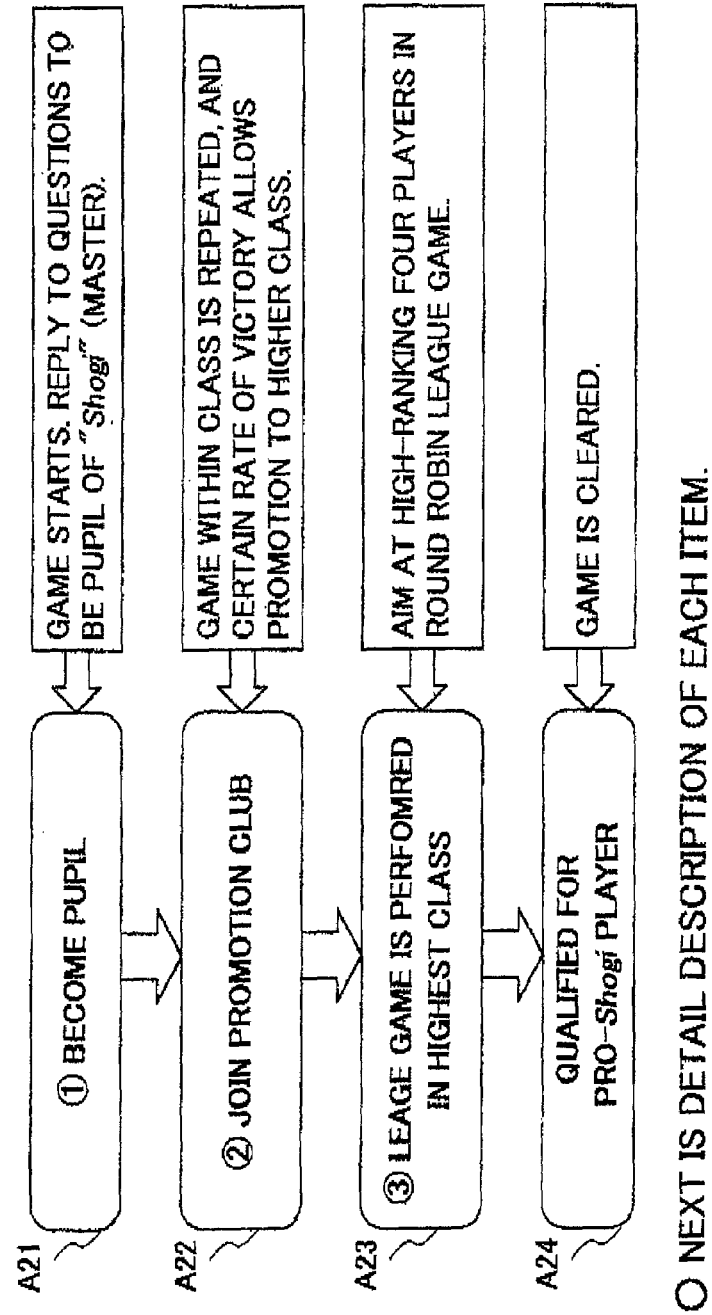
FIG. 23 is a diagram showing, in simplified form, the entire flow of a game of the "aim at pro-shogi player!."

When the user selects the "aim at pro-shogi player!" that is the seventh menu on the top page with the portable telephone 13A, the result of selection is sent from the telephone 13A to the server 18. In response to this, the server 18 provides the portable telephone 13A the game of becoming a pro-shogi player, as shown in FIG. 23.

In this game, the user can enjoy such a game that the user might be qualified for pro-shogi player in the world of game (step S24) by passing through the stages of: (i) becoming pupil in step A21; (ii) joining promotion club in step of A22; and (iii) playing league game in the uppermost class in step A23.

Referring to FIG. 24, in step A21, the server 18 sends some questions testing for capability of shogi to the portable telephone 13A. When the user inputs answers to the questions, the portable telephone 13A sends the answers to the server 18. The server 18 scores the received answers to classify the user depending on the result.

After entering the class according to the score, the user plays a required number of competitive games in step A22 shown in FIG. 25. The user's class increases according to the rate of victory in the competitive games. If the user is in four places in the highest-class league game shown in FIG. 26, the user is qualified as pro-shogi player, and the game is over.

Figure 27:
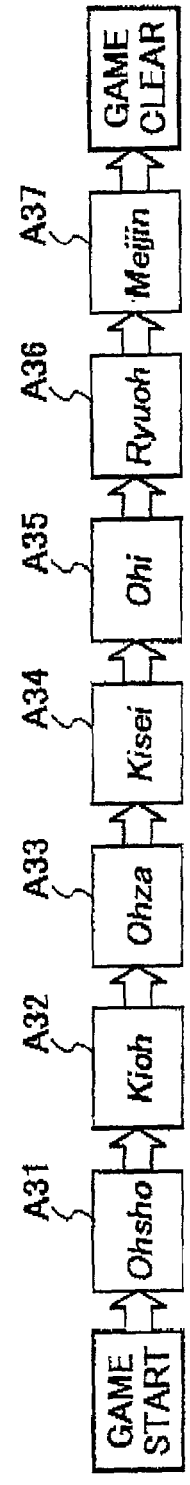
FIG. 27 is a diagram showing, in simplified form, the entire flow of a game of "title match."

Then, the user thus qualified as pro-shogi player in the game world can join several title matches for playing competitive games with other player or the competitive game program in Ohsho-game (step A31), as shown in FIG. 27. If wins the Ohsho-game, the user can proceed to (i) Kioh-game (step A32), (ii) Ohza-game (step A33), (iii) Kisei-game (step A34), (iv) Ohi-game (step A35), (v) Ryuoh-game (step A36), and (vi) Meijin-game (step A37), in this order. Finally, if wins the Meijin-game, the user is qualified as "Nanakanoh" (Seven-title-holder), and the game is over.

Figure 28:
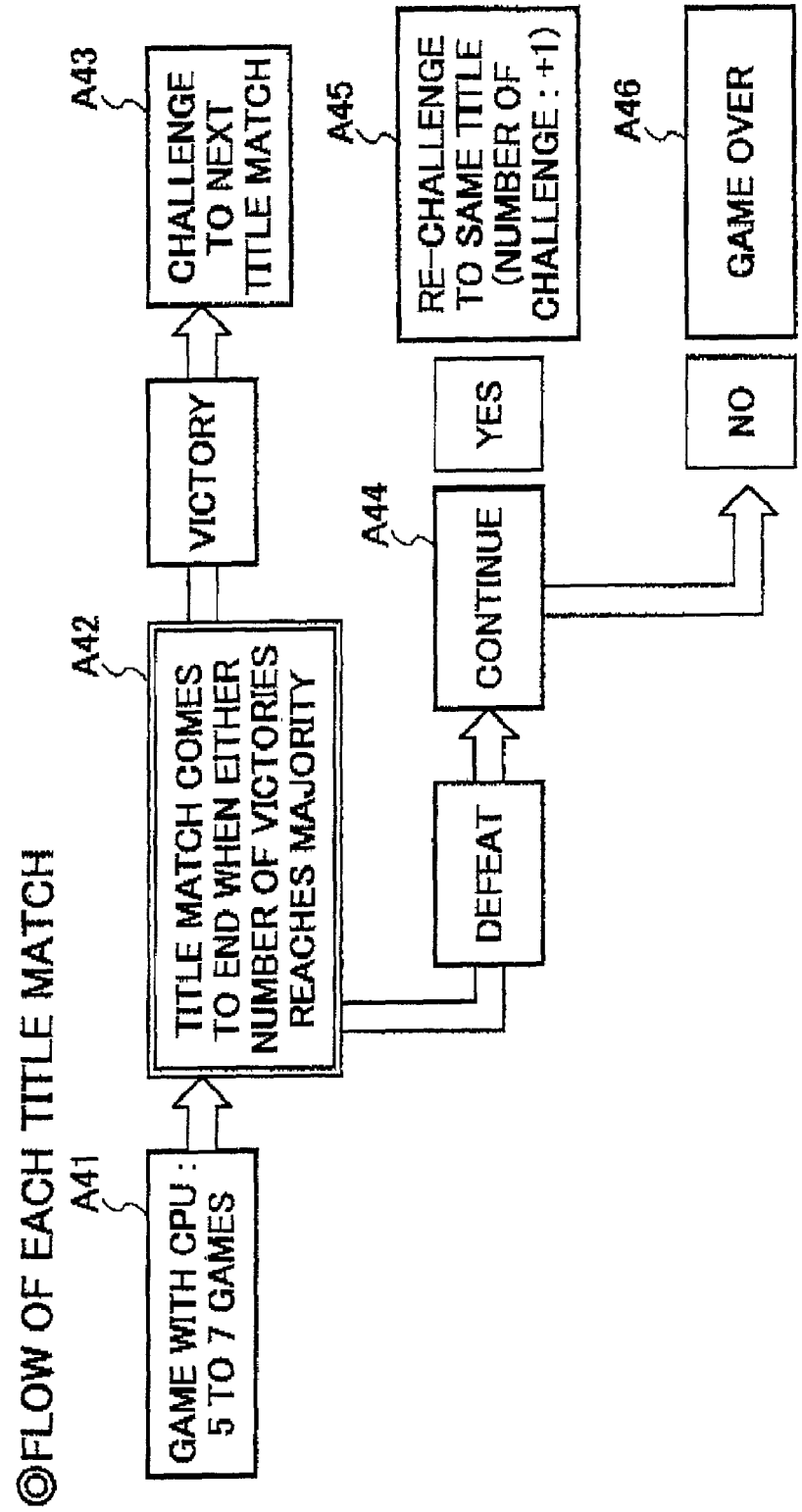
FIG. 28 is a flowchart showing the flow of processing of the "title match."

Referring to FIG. 28, in each of the title matches, a predetermined number of competitive games are performed in step A41. Each title match comes to end when the number of victory of the user, other player, or competitive game program reaches majority (step A42). If the user wins this title match, the user can play the next title match in step A43. If defeats there, the user proceeds to step A44. By selecting "continue", the user proceeds to step A45 and re-challenges to the same title. On the other hand, unless the user selects "continue" in step A44, the user proceeds to step A46, and the game is over.

The server 18 executes the above-mentioned processing in each title match, in order to make ranking comparisons between the user and other player desiring the same title as the user. In this instance, the user and this player enter different ranks depending on the number of challenges to the title, as shown in FIG. 29. By viewing the ranking display, the user can confirm his/her own level.

Description of Other Services

Referring to FIG. 30, as "tsume-shogi" (chess problem) provided from the server 18 to the portable telephone 13A, there are (i) "coordinate input method" in which the user is required to think solutions by himself/herself and proceed the game by coordinate-input designation on the game-playing-face of shogi board as in normal game, and (ii) "selection method" in which the user selects the right answer from three to five items for each move. The "tsume-shogi" facilitates the user's understanding of shogi rule.

Referring to FIG. 31, in "shogi divination" provided from the server 18 to the portable telephone 13A, when the user selects, for example, "love fortune" on the item selection screen displayed on the display part 24 of the telephone 13A, the server 18 sends the telephone 13A the result of love fortune that is based on the user's date of birth. The telephone 13A displays image of "tossing shogi pieces" on the display part 24, until receipt of the divination result. The divination results are expressed by combination of pieces, together with comments in literal characters.

Figure 32:
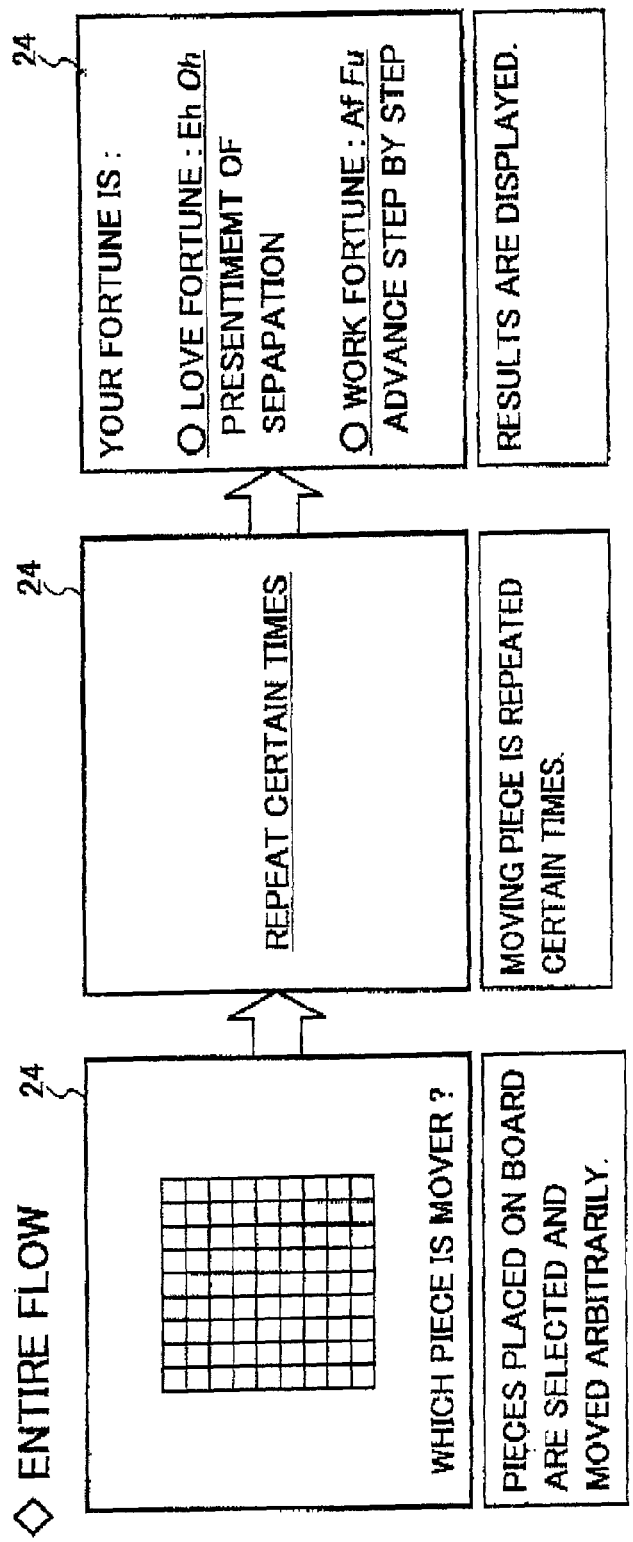

Referring to FIG. 32, in the "shogi divination", the user repeats removal of an arbitrary piece a required number at the board's game-playing face displayed on the display part 24 of the portable telephone 13A. The order of the removals corresponds to the divination items of "love fortune", "work/study fortune", and "health fortune." The divination results are obtained depending on the selected piece and the location of the piece in the procedure of piece removal.

Referring to FIG. 33, in the "shogi divination", the user's fortune can also be obtained as follows. The user selects the desired piece from a plurality of blank pieces displayed on the display part 24 of the portable telephone 13A, and the type of the selected piece tells the user's fortune.

Referring to FIG. 34, the server 18 provides the portable telephone 13A some games in which irregular rules are applied to the normal game of shogi.

As example of such games, there are a first game of competing how many pieces are taken from the competitor within a predetermined number of moves, such as 100 or 200 moves; and a second game of competing for victory without using pieces taken from the competitor.

Referring to FIG. 35, the server 18 provides the portable telephone 13A some shogi games such as "hasami-shogi" (checkerlike game on shogi board), and "mawari-shogi" (go-round shogi), which are for the user who is a beginner.

In addition, the server 18 opens to the portable telephone 13A "shogi entrance corner" providing explanation of the rule and terms of shogi. This corner is intended for beginners and aims at increasing shogi fan by displaying on the screen, for example, pro-shogi players' portrait characters subjected to deformation, besides information in literal characters used for explaining the terms etc.

Referring to FIG. 37, the server 18 also provides various information of shogi. These information contain, for example, pages presenting pro-shogi players' profiles and pages presenting everyday happening of pro-shogi players. Thus, the information from the server 18 covers a variety of information about shogi, which are useful to facilitate the user's understanding of shogi and stimulate the user's interests in shogi.

Operations and Effects

The foregoing preferred embodiment produces mainly the following operations and effects.

(1) The competitive game program and virtual game player list are previously stored in a server. The server provides on network a competitive game service to a plurality of game players' terminals via communication lines. The server sets such that, (i) under the condition that the number of competitors against a game player is below a predetermined number, a competitive game program is activated to play the game with the game player; and (ii) as a competitor, a virtual game player's name previously entered on the virtual game player list is notified to the game player who is to play the competitive game with the competitive game program. Therefore, the game player can enjoy the competitive game with the virtual game player, even if the number of competitors is insufficient when receiving the competitive game service. This avoids the inconvenience that although the game player (user) gains access to the competitive game site for the purpose of playing the competitive game, the player cannot help giving up playing the game, as has been conventional. It is also avoided that due to the absence of the competitor, the player reluctantly decides to play the competitive game with the computer, as has been conventional. That is, when it is automatically judged that the number of competitors is below a predetermined number, a preset virtual player name is notified to start the game. Therefore, the game player may play the game without detecting the competitor is the computer. This prevents the game player's fight from being weakened. Also, the server side can provide such a competitive game environment where the competitive game is available at any time. It is therefore able to produce such a stage effect that the competitive game site appears to be always prosperous in the eyes of the game player as the user of the server.

(2) The notification of the virtual game player's name is performed as follows: (i) a number of game players lacking for the game are selected from a plurality of virtual game players previously entered on the virtual game player list; and (ii) as a competitor's name, the virtual game players' names of the selected game players are sent to the game player's terminal. This reduces the possibility of being detected that the competitor is the computer, even when the name of a game player who played with the user many times is notified again in the competitive game on network.

(3) A plurality of competitive game programs having different thinking routines are prepared in advance, so that different competitive game programs are applied to virtual game player' names. This further reduces the possibility that the game player detects from the game pattern that the competitor is the computer.

What is claimed is:

1. A server, operating with a competitive game program and a virtual game player list, and being configured for use on a network supporting a competitive game service for actual game players to competitively play with one another, comprising:

a system for operating one or more virtual game players, configured such that when a given actual game player of a plurality of available actual game players receives the competitive game service, and the number of the plurality of available actual game players is below a predetermined number, the system is activated to operate as one or more virtual game players selected from the virtual game player list, each virtual game player of the one or more virtual game players being provided with a different thinking routine, wherein the system is operative to operate the one or more virtual game players to competitively play with actual game players on the competitive game service; and a system for notifying the given actual game player of the availability of game players to competitively play by sending a mail message that preparation for a game is completed after connection between the server and the given actual game player is discontinued temporally even if the system for operating operates the one or more virtual game players to competitively play, the system for notifying being configured such that the one or more virtual game players appear to the plurality of available actual game players as actual game players.

2. The server according to claim 1, wherein:
the device for notifying is configured to select the one or more virtual game players from the virtual game player list, and to send the selected virtual game players' names to the actual game players; and
the selected number of virtual game players equals a number of actual game players lacking from the competitive game.

3. The server of claim 1, wherein the competitive game program is configured to support playing, as a two-player competitive game, one or more games selected from the group of: mah-jong, shogi, igo, chess and othello.

4. The server of claim 1, wherein the competitive game program is configured to support playing a tournament composed of a plurality of the same kinds of games.

5. The server of claim 1, wherein the device for notifying is configured to select a virtual game player of a player class similar to that of an actual game player to be notified.

6. The server of claim 1, wherein the device for activating is configured such that actual game players may review their games after such games are completed.

7. The server of claim 1, wherein the device for activating is configured to provide game players with a training program to develop their playing skills.

8. The server of claim 1, wherein the device for notifying the actual game players of the availability of the selected virtual game players provides information that preparation for a game is completed excluding any information that presented competitors are virtual players.

9. The server of claim 1, wherein the device for notifying the actual game players of the availability of the selected virtual game players provides as much information as in a case that presented competitors are actual game players such that the virtual game players appear to the actual game players as other actual game players.

10. A program storage medium for use with a server, the server operating with a competitive game program and a virtual game player list on a network supporting a competitive game service for actual game players to competitively play with one another, the program storage medium having computer-executable instructions for performing a method comprising:

activating the competitive game program to operate as one or more virtual game players selected from the virtual game player list, each virtual game player of the one or more virtual game players being provided with a different thinking routine, being conditioned on the event that a given actual game player of a plurality of available actual game players receives the competitive game service and the number of the plurality of available actual game players is below a predetermined number, wherein the one or more virtual game players competitively play with actual game players on the competitive game service; and notifying the given actual game player of the availability of game players to competitively play by sending a mail message that preparation for a game is completed after connection between the server and the given actual game player is discontinued temporally even if the program operates the one or more virtual game players to competitively play, wherein the one or more virtual game players appear to the plurality of available actual game players as actual game players.

11. The program storage medium according to claim 10, wherein the instructions for performing the method further comprise:

selecting the one or more virtual game players from the virtual game player list, and sending the selected virtual game players' names to the actual game players; and
the selected number of virtual game players equals a number of actual game players lacking from the competitive game.

12. The program storage medium of claim 10, wherein the step of notifying includes providing information that preparation for a game is completed excluding information that presented competitors are virtual players set in accordance with the competitive game program.

13. The program storage medium of claim 10, wherein the step of notifying includes providing as much information as in a case that presented competitors are actual game players.

14. A method for providing one or more virtual game players on a network supporting a competitive game service for actual game players to competitively play with one another, comprising:

activating a competitive game program to operate as one or more virtual game players selected from a virtual game player list, each virtual game player of the one or more virtual game players being provided with a different thinking routine, the step of activating being conditioned on the event that a given actual game player of a plurality of available actual game players receives the competitive game service, and the number of the plurality of available actual game players is below a predetermined number, wherein the one or more virtual game players competitively play with actual game players on the competitive game service; and notifying the given actual game player of the availability of game players to competitively play by sending a mail message that preparation for a game is completed after connection between a server on the network and the given actual game player is discontinued even if the program operates the one or more virtual game players to competitively play, wherein the one or more virtual game players appear to the plurality of available actual game players as actual game players.

15. The method of claim 14, wherein the notification step includes:

selecting the one or more virtual game players from the virtual game player list, wherein the selected number of virtual game players equals a number of actual game players lacking from the competitive game; and sending the selected virtual game players' names to the actual game players.

16. The method of claim 14, wherein the step of notifying includes providing information that preparation for a game is completed excluding information that presented competitors are virtual players set in accordance with the competitive game program.

17. The method of claim 14, wherein the step of notifying includes providing as much information as in a case that presented competitors are actual game players.

* * * * *